(12) United States Patent
Mongin et al.

(10) Patent No.: US 10,785,834 B2
(45) Date of Patent: Sep. 22, 2020

(54) RADIO FREQUENCY HEATING AND DEFROSTING APPARATUS WITH IN-CAVITY SHUNT CAPACITOR

(71) Applicant: NXP USA, Inc., Austin, TX (US)

(72) Inventors: Lionel Mongin, Chandler, AZ (US); Pierre Marie Jean Piel, Chandler, AZ (US); Xiaofei Qiu, Tempe, AZ (US)

(73) Assignee: NXP USA, Inc., Austin, TX (US)

( * ) Notice: Subject to any disclaimer, the term of this patent is extended or adjusted under 35 U.S.C. 154(b) by 262 days.

(21) Appl. No.: 15/843,290

(22) Filed: Dec. 15, 2017

(65) Prior Publication Data

US 2019/0191500 A1    Jun. 20, 2019

(51) Int. Cl.
| | |
|---|---|
| H05B 6/68 | (2006.01) |
| H05B 6/66 | (2006.01) |
| H05B 6/64 | (2006.01) |
| H05B 6/72 | (2006.01) |
| H05B 6/62 | (2006.01) |
| F25D 23/12 | (2006.01) |

(52) U.S. Cl.
CPC .............. *H05B 6/688* (2013.01); *H05B 6/62* (2013.01); *H05B 6/6402* (2013.01); *H05B 6/6467* (2013.01); *H05B 6/664* (2013.01); *H05B 6/72* (2013.01); *F25D 23/12* (2013.01)

(58) Field of Classification Search
CPC ......... H05B 6/688; H05B 6/62; H05B 6/6402
USPC ........ 219/497, 505, 703, 704, 746, 751, 771
See application file for complete search history.

(56) References Cited

U.S. PATENT DOCUMENTS

| | | |
|---|---|---|
| 2,868,940 A | 1/1959 | Jennings et al. |
| 4,303,820 A | 12/1981 | Stottmann et al. |
| 4,333,521 A | 6/1982 | Stottman et al. |
| 4,341,937 A | 7/1982 | Staats |
| 4,507,530 A | 3/1985 | Smith |
| 4,771,355 A | 9/1988 | Emery et al. |
| 4,803,854 A | 2/1989 | Kikuchi et al. |
| 4,870,235 A | 9/1989 | Steers et al. |
| 4,874,914 A | 10/1989 | Eke |
| 4,874,915 A | 10/1989 | Harms et al. |
| 5,036,172 A | 7/1991 | Kokkeler et al. |

(Continued)

FOREIGN PATENT DOCUMENTS

| | | |
|---|---|---|
| CN | 101161560 | 4/2008 |
| CN | 201914941 U | 8/2011 |

(Continued)

OTHER PUBLICATIONS

JP S56 148273 with Machine Translation (Year: 1981).*

(Continued)

*Primary Examiner* — Vishal Pancholi

(57) ABSTRACT

A radio frequency (RF) heating and defrosting apparatus may include an electrode which, when supplied with RF signal energy, may responsively radiate electromagnetic energy into a cavity of the RF heating and defrosting apparatus. This radiated electromagnetic energy may cause a thermal increase of a load in the cavity. A capacitor may be formed from a portion of the electrode and a conductive plate disposed adjacent to the electrode. The conductive plate may be coupled to a ground reference structure. Dielectric material(s) having a low dielectric constant may be disposed directly between the electrode and the conductive plate.

23 Claims, 9 Drawing Sheets

(56) References Cited

U.S. PATENT DOCUMENTS

| | | | |
|---|---|---|---|
| 5,180,895 | A | 1/1993 | Briggs et al. |
| 5,349,166 | A | 9/1994 | Taylor |
| 5,407,524 | A | 4/1995 | Patrick et al. |
| 5,507,055 | A | 4/1996 | Blauert et al. |
| 5,512,736 | A | 4/1996 | Kang et al. |
| 5,585,766 | A | 12/1996 | Shel |
| 5,641,423 | A | 6/1997 | Bridges et al. |
| 5,872,475 | A | 2/1999 | Otaka |
| 6,198,084 | B1 | 3/2001 | Kim |
| 6,247,395 | B1 | 6/2001 | Yamamoto |
| 6,259,334 | B1 | 7/2001 | Howald |
| 6,657,173 | B2 | 12/2003 | Flugstad et al. |
| 6,784,405 | B2 | 8/2004 | Flugstad et al. |
| 6,887,339 | B1 | 5/2005 | Goodman et al. |
| 7,761,247 | B2 | 7/2010 | Van Zyl |
| 8,162,932 | B2 | 4/2012 | Podhajsky et al. |
| 8,207,479 | B2 | 6/2012 | Ben-Shmuel et al. |
| 8,375,319 | B2 | 2/2013 | Decker et al. |
| 8,562,793 | B2 | 10/2013 | Novak |
| 9,131,543 | B2 | 9/2015 | Ben-Shmuel et al. |
| 9,215,756 | B2 | 12/2015 | Bilchinsky et al. |
| 9,298,873 | B2 | 3/2016 | Ishizuka et al. |
| 9,337,000 | B2 | 5/2016 | Marakhtanov et al. |
| 9,584,090 | B2 | 2/2017 | Mavretic |
| 9,720,022 | B2 | 8/2017 | Howald et al. |
| 9,755,576 | B2 | 9/2017 | Perreault et al. |
| 9,809,480 | B2 | 11/2017 | Stephenson et al. |
| 2002/0046474 | A1 | 4/2002 | Novak et al. |
| 2004/0084380 | A1 | 5/2004 | Kicinski |
| 2006/0081624 | A1 | 4/2006 | Takada et al. |
| 2009/0058550 | A1 | 3/2009 | Ella et al. |
| 2012/0000888 | A1 | 1/2012 | Kawasaki et al. |
| 2012/0067872 | A1 | 3/2012 | Libman et al. |
| 2012/0103973 | A1 | 5/2012 | Rogers et al. |
| 2012/0119842 | A1 | 5/2012 | Gu et al. |
| 2012/0122072 | A1 | 5/2012 | Bilchinsky et al. |
| 2012/0168645 | A1 | 7/2012 | Atzmony et al. |
| 2013/0080098 | A1 | 3/2013 | Hadad et al. |
| 2013/0193913 | A1 | 8/2013 | Takada et al. |
| 2013/0257667 | A1 | 10/2013 | Kang |
| 2013/0284725 | A1 | 10/2013 | Bilchinsky et al. |
| 2013/0334214 | A1 | 12/2013 | Yogev et al. |
| 2014/0167878 | A1 | 6/2014 | Lee |
| 2014/0287100 | A1 | 9/2014 | Libman |
| 2015/0351164 | A1 | 12/2015 | Wesson et al. |
| 2016/0221441 | A1 | 8/2016 | Hall et al. |
| 2016/0248396 | A1 | 8/2016 | Mavretic |
| 2018/0042073 | A1 | 2/2018 | Scott et al. |
| 2018/0042074 | A1 | 2/2018 | Qiu et al. |
| 2018/0115298 | A1 | 4/2018 | Fujimoto et al. |
| 2018/0146518 | A1 | 5/2018 | Ma et al. |
| 2018/0220499 | A1 | 8/2018 | Sims et al. |
| 2019/0008005 | A1 | 1/2019 | Dore et al. |
| 2019/0141799 | A1 | 5/2019 | Mongin et al. |
| 2019/0158039 | A1 | 5/2019 | Koya et al. |
| 2019/0158055 | A1 | 5/2019 | Mongin et al. |
| 2019/0191501 | A1 | 6/2019 | Piel et al. |
| 2019/0306933 | A1 | 10/2019 | McCarville et al. |
| 2020/0084844 | A1 | 3/2020 | Qiu et al. |
| 2020/0092957 | A1 | 3/2020 | Ma et al. |
| 2020/0170081 | A1 | 5/2020 | McCarville et al. |

FOREIGN PATENT DOCUMENTS

| | | |
|---|---|---|
| CN | 102951760 A | 3/2013 |
| CN | 203021337 U | 6/2013 |
| CN | 203247118 U | 10/2013 |
| CN | 103903944 A | 7/2014 |
| CN | 104377106 A | 2/2015 |
| CN | 108521691 A | 9/2018 |
| CN | 108812854 A | 11/2018 |
| CN | 109000396 A | 12/2018 |
| CN | 208521691 U | 2/2019 |
| DE | 3818491 A1 | 12/1989 |
| DE | 11 2014001599 T5 | 6/2016 |
| EP | 0597497 A1 | 5/1994 |
| EP | 1818076 | 8/2007 |
| EP | 2445312 A1 | 4/2012 |
| EP | 3185648 A1 | 6/2017 |
| EP | 3240142 A1 | 11/2017 |
| GB | 2465442 A | 5/2010 |
| JP | 55-44199 | 3/1980 |
| JP | S56-148273 A | 11/1981 |
| JP | S5950305 B2 | 12/1984 |
| JP | 63-207921 | 8/1988 |
| JP | 3-72840 A | 3/1991 |
| JP | 08-185966 A | 7/1996 |
| JP | H08 255682 A | 10/1996 |
| JP | H10 134953 A | 5/1998 |
| JP | 2003-332037 A | 11/2003 |
| JP | 2003347035 A | 12/2003 |
| JP | 2004057101 A | 2/2004 |
| JP | 2005056781 A | 3/2005 |
| JP | 2017-182885 A | 10/2017 |
| JP | 6375032 B2 | 8/2018 |
| JP | H0327120 U | 3/2019 |
| WO | 2017017407 A1 | 2/2007 |
| WO | 2007117754 A2 | 10/2007 |
| WO | 2010060233 A1 | 6/2010 |
| WO | 2012001523 A2 | 1/2012 |
| WO | 2012024517 A1 | 2/2012 |
| WO | 2013033330 A2 | 3/2013 |
| WO | 2015/028839 A1 | 3/2015 |
| WO | 2015052145 A1 | 4/2015 |
| WO | 2017123145 A1 | 7/2017 |
| WO | 2017144873 A1 | 8/2017 |
| WO | 2018223939 A1 | 12/2018 |
| WO | 2018223946 A1 | 12/2018 |

OTHER PUBLICATIONS

Cottee, Christopher et al; "Design of Matching Circuit Controllers for Radio-Frequency Healing"; IEEE Transactions on Control Systems Technology, vol. 11, No. 1; 10 pages (Jan. 2003).

Ameri, M. et al.; "Pattern Matching Algorithm for Identification of Load Mass of an Elastic Robot Arm"; American Control Conference; 2 pages (1988).

Doherty, Mark F. et al; "Automatic Detection of Mass-Resolved Ion Conics"; IEEE Transactions on Geoscience and Remote Sensing, vol. 31, No. 2; 10 pages (Mar. 1993).

U.S. Appl. No. 16/225,749, filed Dec. 19, 2018; not yet published; 102 pages.

U.S. Appl. No. 16/230,425, not yet published; 122 Pages (filed Dec. 21, 2018).

Final Office Action; U.S. Appl. No. 15/456,398; 28 pages (dated Jul. 22, 2020).

\* cited by examiner

RADIO FREQUENCY HEATING AND DEFROSTING APPARATUS WITH IN-CAVITY SHUNT CAPACITOR

TECHNICAL FIELD

Embodiments of the subject matter described herein relate generally to apparatus and methods of defrosting and heating a load with radio frequency (RF) energy.

BACKGROUND

Conventional capacitive food defrosting (or thawing) systems include large electrodes contained within a heating compartment. After a food load is placed between the electrodes, low power electromagnetic energy is supplied to one of the electrodes to provide gentle warming of the food load. In these conventional capacitive food defrosting systems, a variable inductor network is often required so that impedance of the path between the source of the low power electromagnetic energy and the electrode can be tuned. However, due to intrinsic properties of these conventional capacitive food defrosting systems, the variable inductor network is generally required to have a large tunable range.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
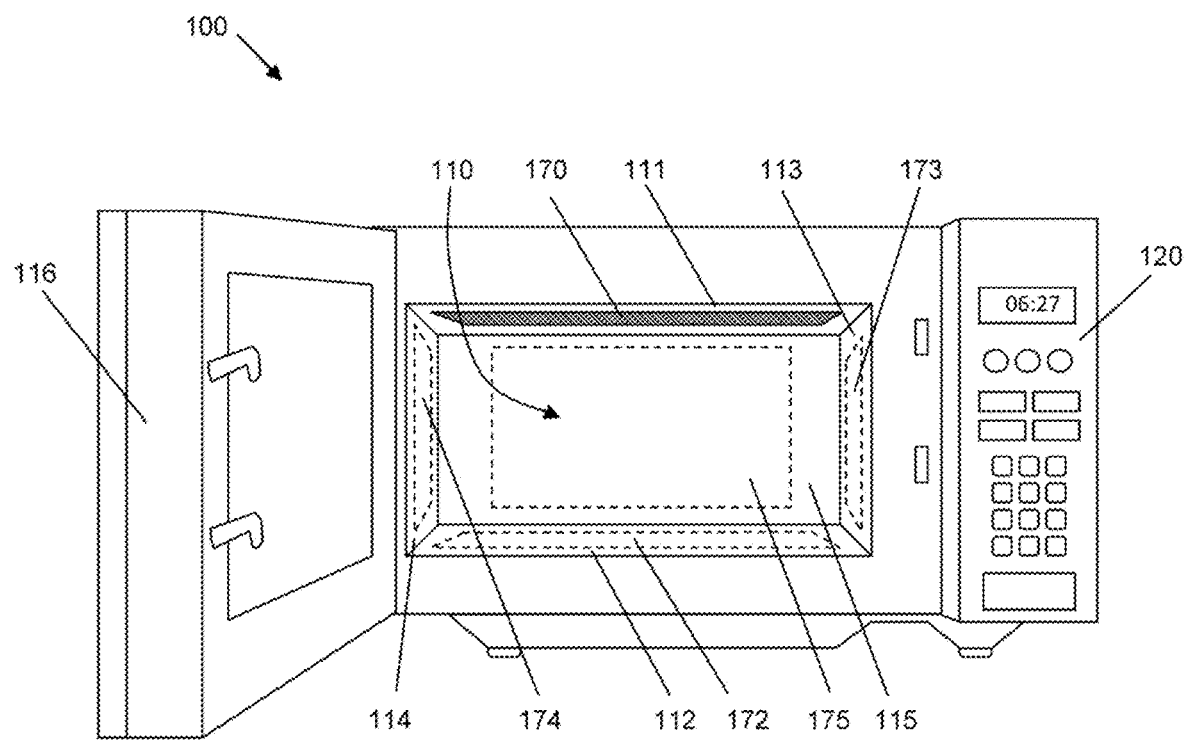
FIG. 1 is a perspective view of a defrosting appliance, in accordance with an example embodiment.

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

Embodiments of the inventive subject matter include apparatus and methods for defrosting and/or heating food loads (or other types of loads) with heating compartments or electrodes that can be removed for cleaning and/or that have modular resonance cavities to accommodate loads of different sizes and/or shapes. Embodiments of the subject matter described herein relate to a solid-state defrosting or heating apparatus that may be incorporated into stand-alone appliances or into other systems. As described in greater detail below, exemplary defrosting/heating systems are realized using a first electrode disposed in a cavity, an amplifier arrangement (including one or more transistors), an impedance matching network coupled between an output of the amplifier arrangement and the first electrode, and a measurement and control system that can detect progress of a defrosting operation of the defrosting apparatus. In an embodiment, the impedance matching network is a variable impedance matching network that can be adjusted during the defrosting operation to improve matching between the amplifier arrangement and the cavity.

Generally, the term "defrosting" means to elevate the temperature of a frozen load (e.g., a food load or other type of load) to a temperature at which the load is no longer frozen (e.g., a temperature at or near 0 degrees Celsius). Note that in the present disclosure references to a "food load" are made as an example of a load for the defrosting system and it should be understood that references to a food load may also refer to other types of loads (e.g., liquids, non-consumable materials) that may be heated by the defrosting system.

As used herein, the term "defrosting" more broadly means a process by which the thermal energy or temperature of a load (e.g., a food load or other type of load) is increased through provision of RF power to the load. Accordingly, in various embodiments, a "defrosting operation" may be performed on a food load with any initial temperature (e.g., any initial temperature above or below 0 degrees Celsius), and the defrosting operation may be ceased at any final temperature that is higher than the initial temperature (e.g., including final temperatures that are above or below 0 degrees Celsius). That said, the "defrosting operations" and "defrosting systems" described herein alternatively may be referred to as "thermal increase operations" and "thermal increase systems." The term "defrosting" should not be construed to limit application of the invention to methods or systems that are only capable of raising the temperature of a frozen load to a temperature at or near 0 degrees Celsius.

In conventional capacitive food defrosting systems, a variable inductor network is often required so that impedance of the path between the source of the low power electromagnetic energy and the electrode can be tuned. However, due to intrinsic properties of these conventional capacitive food defrosting systems, the variable inductor network is generally required to have a large tunable range, and/or a low quality factor (Q-factor) (e.g., corresponding to high internal resistance), which may reduce efficiency of the system and may require the variable inductor network to be larger and/or more complex compared to variable inductor networks with a smaller tunable range. This is because, as a food load is heated, the impedance of the food load will tend to change, potentially causing an impedance mismatch between the amplifier arrangement and the cavity, which can be compensated for by changing the inductance of the variable inductor network. In order to reduce the impact of this change in impedance of the food load, a parallel capacitance may be coupled to the first electrode, which may reduce the inductance range of the variable inductance network needed to tune the impedance of the path between the source of the low power electromagnetic energy and the electrode. For example, this parallel capacitance may be formed from a portion of the first electrode and from a conductive plate that is electrically coupled to a ground reference, such as a grounded containment structure. In other embodiments, the conductive plate could be coupled to a ground reference structure other than the containment structure. It therefore may be advantageous for a defrosting system to include a high Q-factor, low-loss in-cavity capacitor in order to reduce the range of inductance needed to tune the electromagnetic energy provided to the electrode. The in-cavity capacitor may be formed from the electrode and a grounded conductive plate disposed over the electrode. Dielectric material(s) having a low dielectric constant (e.g., low-k dielectric materials) may be disposed directly between the electrode and the conductive plate.

FIG. 1 is a perspective view of a defrosting system 100, in accordance with an example embodiment. Defrosting system 100 includes a defrosting cavity 110, a control panel 120, one or more radio frequency (RF) signal sources (e.g., RF signal source 340, FIG. 3), a power supply (e.g., power supply 350, FIG. 3), a first electrode 170, power detection circuitry (e.g., power detection circuitry 380, FIG. 3), and a system controller (e.g., system controller 330, FIG. 3). The defrosting cavity 110 is defined by interior surfaces of top, bottom, side, and back cavity walls 111, 112, 113, 114, 115 and an interior surface of door 116. With door 116 closed, the defrosting cavity 110 defines an enclosed air cavity. As used herein, the term "air cavity" may mean an enclosed area that contains air or other gasses (e.g., defrosting cavity 110).

According to an embodiment, the first electrode 170 is arranged proximate to a cavity wall (e.g., top wall 111), the first electrode 170 is electrically isolated from the remaining cavity walls (e.g., walls 112-115 and door 116), and the remaining cavity walls are grounded. In such a configuration, the system may be simplistically modeled as a capacitor, where the first electrode 170 functions as one conductive plate, the grounded cavity walls (e.g., walls 112-115) function as a second conductive plate (or electrode), and the air cavity (including any load contained therein) function as a dielectric medium between the first and second conductive plates. Although not shown in FIG. 1, a non-electrically conductive barrier (e.g., barrier 314, FIG. 3) also may be included in the system 100, and the non-conductive barrier may function to electrically and physically isolate the load from the bottom cavity wall 112. Although FIG. 1 shows the first electrode 170 being proximate to the top wall 111, the first electrode 170 alternatively may be proximate to any of the other walls 112-115, as indicated by alternate electrodes 172-175.

According to an embodiment, during operation of the defrosting system 100, a user (not illustrated) may place one or more loads (e.g., food and/or liquids) into the defrosting cavity 110, and optionally may provide inputs via the control panel 120 that specify characteristics of the load(s). For example, the specified characteristics may include an approximate weight of the load. In addition, the specified load characteristics may indicate the material(s) from which the load is formed (e.g., meat, bread, liquid). In alternate embodiments, the load characteristics may be obtained in some other way, such as by scanning a barcode on the load packaging or receiving a radio frequency identification (RFID) signal from an RFID tag on or embedded within the load. Either way, as will be described in more detail later, information regarding such load characteristics enables the system controller (e.g., system controller 330, FIG. 3) to establish an initial state for the impedance matching network of the system at the beginning of the defrosting operation, where the initial state may be relatively close to an optimal state that enables maximum RF power transfer into the load. Alternatively, load characteristics may not be entered or received prior to commencement of a defrosting operation, and the system controller may establish a default initial state for the impedance matching network.

To begin the defrosting operation, the user may provide an input via the control panel 120. In response, the system controller causes the RF signal source(s) (e.g., RF signal source 340, FIG. 3) to supply an RF signal to the first electrode 170, which responsively radiates electromagnetic energy into the defrosting cavity 110. The electromagnetic energy increases the thermal energy of the load (i.e., the electromagnetic energy causes the load to warm up).

During the defrosting operation, the impedance of the load (and thus the total input impedance of the cavity 110 plus load) changes as the thermal energy of the load increases. The impedance changes alter the absorption of RF energy into the load, and thus alter the magnitude of reflected power. According to an embodiment, power detection circuitry (e.g., power detection circuitry 380, FIG. 3) continuously or periodically measures the forward and/or reflected power along a transmission path (e.g., transmission path 348, FIG. 3) between the RF signal source (e.g., RF signal source 340, FIG. 3) and the first electrode 170. Based on these measurements, the system controller (e.g., system controller 330, FIG. 3) may detect completion of the defrosting operation, as will be described in detail below, or determine that the food load has reached a desired temperature or end state. According to a further embodiment, the impedance matching network is variable, and based on the forward and/or reflected power measurements, the system controller may alter the state of the impedance matching network during the defrosting operation to increase the absorption of RF power by the load.

Figure 2:
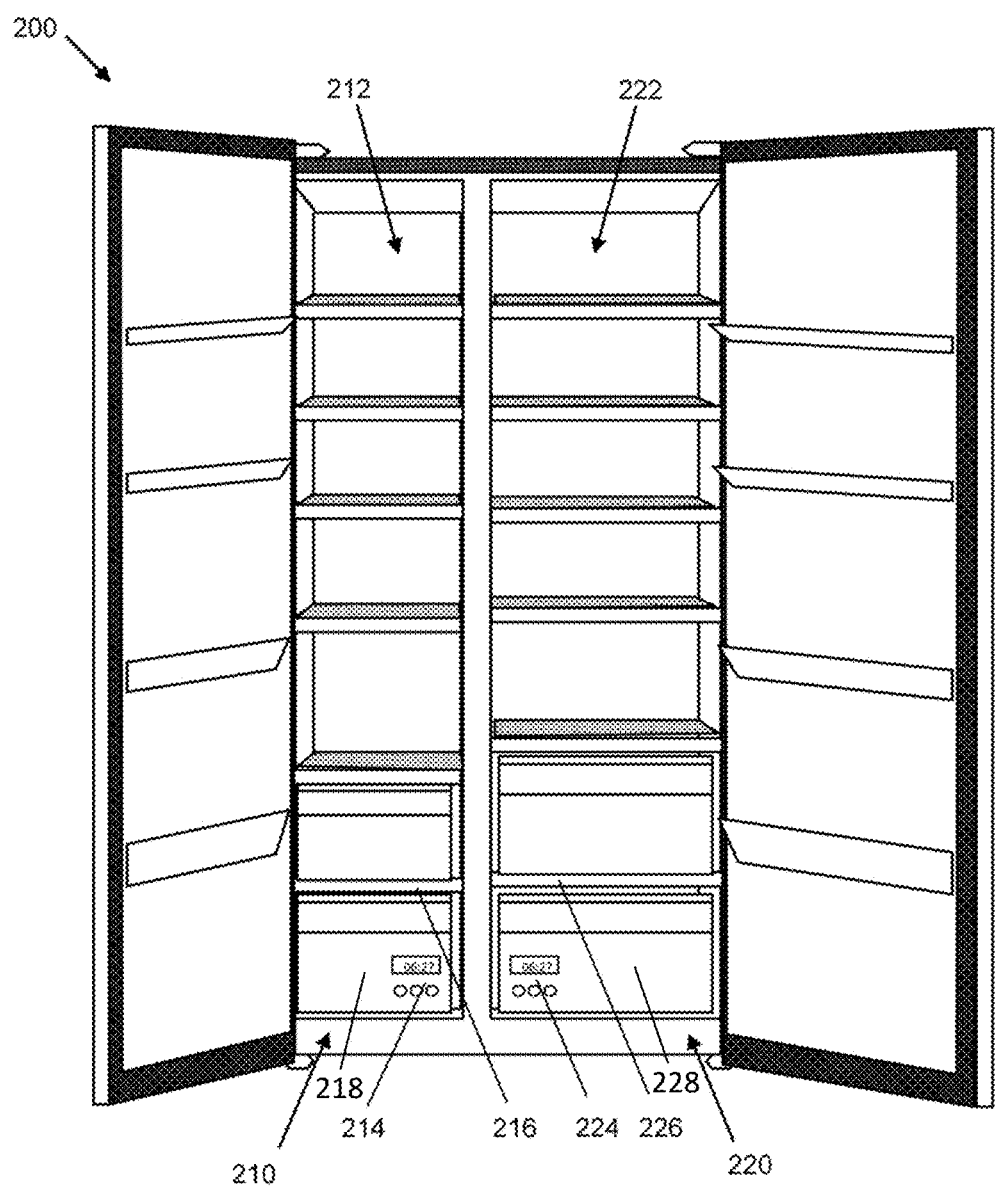
FIG. 2 is a perspective view of a refrigerator/freezer appliance that includes other example embodiments of defrosting systems.

The defrosting system 100 of FIG. 1 is embodied as a counter-top type of appliance. In a further embodiment, the defrosting system 100 also may include components and functionality for performing microwave cooking operations. Alternatively, components of a defrosting system may be incorporated into other types of systems or appliances. For example, FIG. 2 is a perspective view of a refrigerator/freezer appliance 200 that includes other example embodiments of defrosting systems 210, 220. More specifically, defrosting system 210 is shown to be incorporated within a freezer compartment 212 of the system 200, and defrosting system 220 is shown to be incorporated within a refrigerator compartment 222 of the system. An actual refrigerator/freezer appliance likely would include only one of the defrosting systems 210, 220, but both are shown in FIG. 2 to concisely convey both embodiments.

Figure 3:
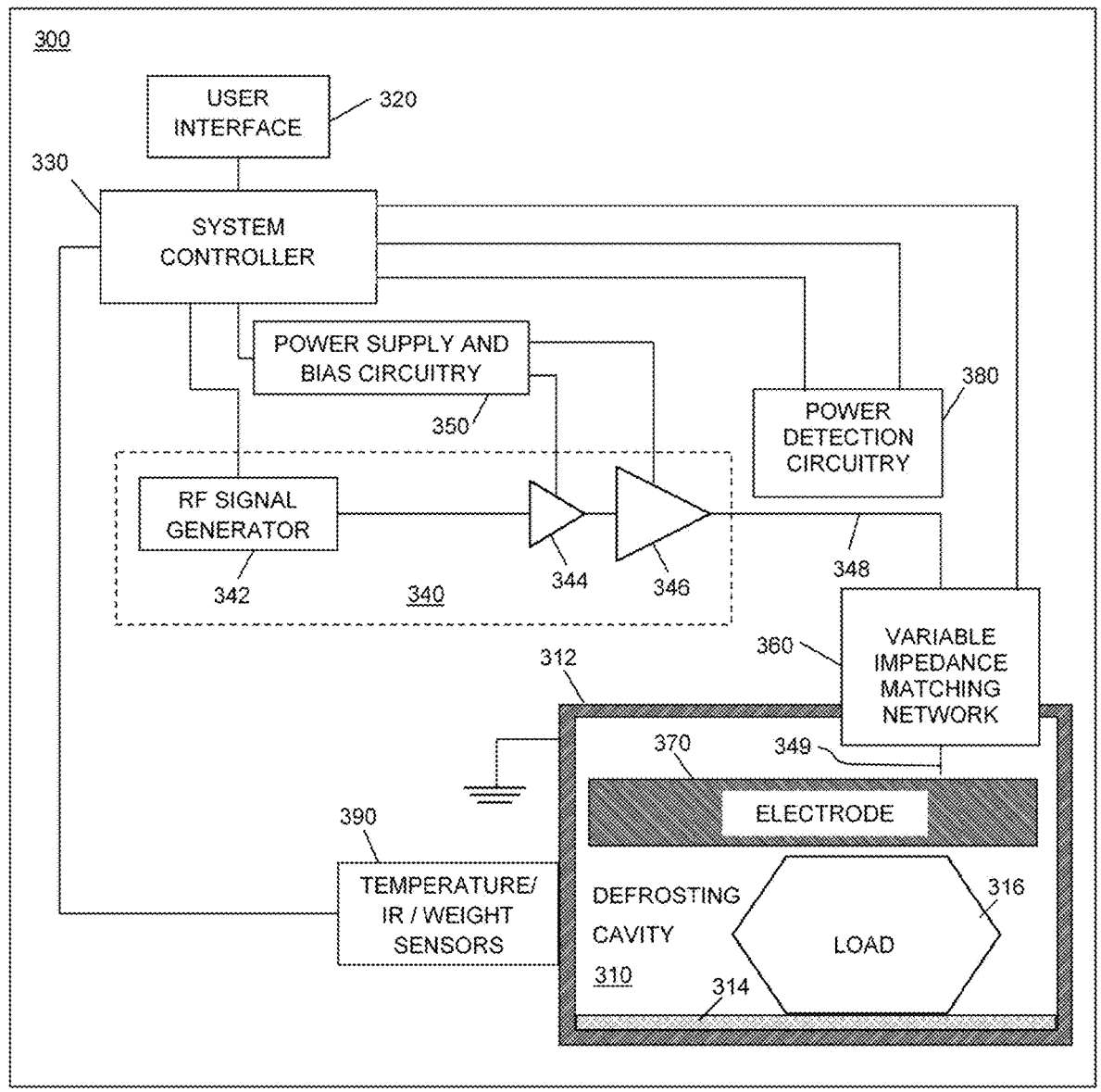
FIG. 3 is a simplified block diagram of a defrosting apparatus, in accordance with an example embodiment.

Similar to the defrosting system 100, each of defrosting systems 210, 220 includes a defrosting cavity, a control panel 214, 224, one or more RF signal sources (e.g., RF signal source 340, FIG. 3), a power supply (e.g., power supply 350, FIG. 3), a first electrode (e.g., electrode 370, 770, FIGS. 3, 7), a second electrode (e.g., electrode 772, FIG. 7), power detection circuitry (e.g., power detection circuitry 380, FIG. 3), drawers 218, 228, and a system controller (e.g., system controller 330, FIG. 3). For example, the defrosting cavity may be defined by interior surfaces of bottom, side, front, and back walls of a drawer 218, 228, and an interior top surface of a fixed shelf 216, 226 under which the drawer 218, 228 may be slid, inserted, or otherwise physically engaged. The drawers 218, 228 may contain or may act as the second electrode for the systems 210, 220. With the drawer 218, 228 slid fully under the shelf, the drawer 218, 228 and shelf 216, 226 define the cavity as an enclosed air cavity. The components and functionalities of the defrosting systems 210, 220 may be substantially the same as the components and functionalities of defrosting system 100, in various embodiments.

In addition, according to an embodiment, each of the defrosting systems 210, 220 may have sufficient thermal communication with the freezer or refrigerator compartment 212, 222, respectively, in which the system 210, 220 is disposed. In such an embodiment, after completion of a defrosting operation, the load may be maintained at a safe temperature (i.e., a temperature at which food spoilage is retarded) until the load is removed from the system 210, 220. More specifically, upon completion of a defrosting operation by the freezer-based defrosting system 210, the cavity within which the defrosted load is contained may thermally communicate with the freezer compartment 212, and if the load is not promptly removed from the cavity, the load may re-freeze. Similarly, upon completion of a defrosting operation by the refrigerator-based defrosting system 220, the cavity within which the defrosted load is contained may thermally communicate with the refrigerator compartment 222, and if the load is not promptly removed from the cavity, the load may be maintained in a defrosted state at the temperature within the refrigerator compartment 222.

Those of skill in the art would understand, based on the description herein, that embodiments of defrosting systems may be incorporated into systems or appliances having other configurations, as well. Accordingly, the above-described implementations of defrosting systems in a stand-alone appliance, a microwave oven appliance, a freezer, and a refrigerator are not meant to limit use of the embodiments only to those types of systems.

Although defrosting systems 100, 200 are shown with their components in particular relative orientations with respect to one another, it should be understood that the various components may be oriented differently, as well. In addition, the physical configurations of the various components may be different. For example, control panels 120, 214, 224 may have more, fewer, or different user interface elements, and/or the user interface elements may be differently arranged. Further, the control panels 214, 224 may be positioned elsewhere (e.g., on a wall within the freezer or refrigerator compartment 212, 222 or on one of the fixed shelves 216, 226). In addition, although a substantially cubic defrosting cavity 110 is illustrated in FIG. 1, it should be understood that a defrosting cavity may have a different shape, in other embodiments (e.g., cylindrical, and so on). Further, defrosting systems 100, 210, 220 may include additional components (e.g., a fan, a stationary or rotating plate, a tray, an electrical cord, and so on) that are not specifically depicted in FIGS. 1, 2.

FIG. 3 is a simplified block diagram of a defrosting system 300 (e.g., defrosting system 100, 210, 220, FIGS. 1, 2), in accordance with an example embodiment. Defrosting system 300 includes defrosting cavity 310, user interface 320, system controller 330, RF signal source 340 configured to produce RF signals, power supply and bias circuitry 350, variable impedance matching network 360, electrode 370, and power detection circuitry 380, in an embodiment. In addition, in other embodiments, defrosting system 300 may include temperature sensor(s), infrared (IR) sensor(s), and/or weight sensor(s) 390, although some or all of these sensor components may be excluded. It should be understood that FIG. 3 is a simplified representation of a defrosting system 300 for purposes of explanation and ease of description, and that practical embodiments may include other devices and components to provide additional functions and features, and/or the defrosting system 300 may be part of a larger electrical system.

User interface 320 may correspond to a control panel (e.g., control panel 120, 214, 224, FIGS. 1, 2), for example, which enables a user to provide inputs to the system regarding parameters for a defrosting operation (e.g., characteristics of the load to be defrosted, and so on), start and cancel buttons, mechanical controls (e.g., a door/drawer open latch), and so on. In addition, the user interface may be configured to provide user-perceptible outputs indicating the status of a defrosting operation (e.g., a countdown timer, visible indicia indicating progress or completion of the defrosting operation, and/or audible tones indicating completion of the defrosting operation) and other information.

System controller 330 may include one or more general purpose or special purpose processors (e.g., a microprocessor, microcontroller, Application Specific Integrated Circuit (ASIC), and so on), volatile and/or non-volatile memory (e.g., Random Access Memory (RAM), Read Only Memory (ROM), flash, various registers, and so on), one or more communication busses, and other components. According to an embodiment, system controller 330 is coupled to user interface 320, RF signal source 340, variable impedance matching network 360, power detection circuitry 380, and sensors 390 (if included). System controller 330 is configured to receive signals indicating user inputs received via user interface 320, and to receive forward and/or reflected power measurements from power detection circuitry 380. Responsive to the received signals and measurements, and as will be described in more detail later, system controller 330 provides control signals to the power supply and bias circuitry 350 and to the RF signal generator 342 of the RF signal source 340. In addition, system controller 330 provides control signals to the variable impedance matching network 360, which cause the network 360 to change its state or configuration.

Defrosting cavity 310 includes a capacitive defrosting arrangement with first and second parallel plate electrodes that are separated by an air cavity within which a load 316 to be defrosted may be placed. For example, a first electrode 370 (e.g., first electrode 770, FIG. 7) may be positioned above the air cavity, and a second electrode (not shown) may, for example, be provided by a drawer (e.g., drawer 218, 228, FIG. 2), by a portion of containment structure 312, or by a conductive element embedded or otherwise integrated in non-conductive barrier structure 314. According to an embodiment, the cavity 310 may be sealed (e.g., by closing a door 116, FIG. 1 or a conductive sliding door, or by sliding a drawer closed under a shelf such as shelf 216, 226, FIG. 2) to contain the electromagnetic energy that is introduced into the cavity 310 during a defrosting operation. The system 300 may include one or more interlock mechanisms that ensure that the seal is intact during a defrosting operation. If one or more of the interlock mechanisms indicates that the seal is breached, the system controller 330 may cease the defrosting operation. According to an embodiment, the containment structure 312 is at least partially formed from conductive material, and the conductive portion(s) of the containment structure may be grounded. Alternatively, at least the portion of the containment structure 312 that corresponds to the bottom surface of the cavity 310 may be formed from conductive material and grounded. Either way, the containment structure 312 (or at least the portion of the containment structure 312 that is parallel with the first electrode 370, such as a bottom interior surface or "platform" of one of drawers 218, 228, FIG. 2) may function as a second electrode of the capacitive defrosting arrangement, and also as a ground reference structure. To avoid direct contact between the load 316 and the grounded bottom surface of the cavity 310, a non-conductive barrier 314 may be positioned over the bottom surface (e.g., bottom wall or "platform") of the cavity 310.

Defrosting cavity 310 and any load 316 (e.g., food, liquids, and so on) positioned in the defrosting cavity 310 present a cumulative load for the electromagnetic energy (or RF power) that is radiated into the cavity 310 by the first electrode 370. More specifically, the cavity 310 and the load 316 present an impedance to the system, referred to herein as a "cavity input impedance." The cavity input impedance changes during a defrosting operation as the temperature of the load 316 increases. The impedance of many types of food loads changes with respect to temperature in a somewhat predictable manner as the food load transitions from a frozen state to a defrosted state. According to an embodiment, based on reflected and/or forward power measurements from the power detection circuitry 380, the system controller 330 is configured to identify a point in time during a defrosting operation when the rate of change of cavity input impedance indicates that the load 316 is approaching a particular temperature (e.g., between −4 and 0 degrees Celsius), at which time the system controller 330 may terminate the defrosting operation. Specifically, the system controller 330 is configured to monitor reflected and/or forward power measurements over time while the food load is being defrosted. Upon detecting when the rate change in the return losses has plateaued, the controller uses historical measurement of the rates of change in return losses to determine an additional amount of time and/or energy for the defrosting process to continue in order that the food load reaches a desired end state—i.e., a tempered state between −4 and 0 degrees Celsius. Using either the determined additional amount of time or energy required, the defrosting processes can then be controlled and stopped when the food load has reached the desired end state. It should be noted that controlling and stopping the defrosting processes of defrosting system 300 are not necessarily based only on monitoring reflected and/or forward power measurements over time, and this example is intended to be illustrative and not limiting. In other embodiments, controlling and stopping the defrosting processes of defrosting system 300 may be performed based on the total time of defrosting and the total energy that has been delivered to the cavity 310, based on monitoring the status of the impedance matching network, based on IR data collected by IR sensor(s) 390, or based on any combination of these.

The first electrode 370 is electrically coupled to the RF signal source 340 through a variable impedance matching network 360 and a transmission path 348, in an embodiment. As will be described in more detail later, the variable impedance matching circuit 360 may be disposed within a sealed portion of the cavity created by containment structure 312 (e.g., above first electrode 370), and is configured to perform an impedance transformation from an impedance of the RF signal source 340 to an input impedance of defrosting cavity 340 as modified by the load 316. In an embodiment, the variable impedance matching network 360 includes a network of passive components (e.g., inductors, capacitors, resistors). According to a more specific embodiment, the variable impedance matching network 360 includes a plurality of fixed-value inductors (e.g., inductors 412-414, 712-714, FIGS. 4, 7) that are positioned within the containment structure 312 and which are electrically coupled to the first electrode 370. In addition, the variable impedance matching network 360 includes a plurality of variable inductance networks (e.g., networks 410, 411, 500, FIGS. 4, 5), which may be located inside or outside of the cavity 310. The inductance value provided by each of the variable inductance networks is established using control signals from the system controller 330, as will be described in more detail later. In any event, by changing the state of the variable impedance matching network 360 over the course of a defrosting operation to dynamically match the ever-changing cavity input impedance, the amount of RF power that is absorbed by the load 316 may be maintained at a high level despite variations in the load impedance during the defrosting operation.

According to an embodiment, RF signal source 350 includes an RF signal generator 342 and a power amplifier (e.g., including one or more power amplifier stages 344, 346), which may be, for example, disposed behind a rear wall of a refrigerator (e.g., system 200 of FIG. 2) or may be integrated as part of a shelf assembly (e.g., shelf 216, 226, FIG. 2) that forms part of containment structure 312. In response to control signals provided by system controller 330, RF signal generator 342 is configured to produce an oscillating electrical signal having a frequency in the ISM (industrial, scientific, and medical) band, although the system could be modified to support operations in other frequency bands, as well. The RF signal generator 342 may be controlled to produce oscillating signals of different power levels and/or different frequencies, in various embodiments. For example, the RF signal generator 342 may produce a signal that oscillates in a range of about 3.0 megahertz (MHz) to about 300 MHz. Some desirable frequencies may be, for example, 13.56 MHz (+/−5 percent), 27.125 MHz (+/−5 percent), and 40.68 MHz (+/−5 percent). In one particular embodiment, for example, the RF signal generator 342 may produce a signal that oscillates in a range of about 40.66 MHz to about 40.70 MHz and at a power level in a range of about 10 decibels (dBm) to about 15 dBm. Alternatively, the frequency of oscillation and/or the power level may be lower or higher than the above-given ranges or values.

In the embodiment of FIG. 3, the power amplifier includes a driver amplifier stage 344 and a final amplifier stage 346. The power amplifier is configured to receive the oscillating signal from the RF signal generator 342, and to amplify the signal to produce a significantly higher-power signal at an output of the power amplifier. For example, the output signal may have a power level in a range of about 100 watts to about 400 watts or more. The gain applied by the power amplifier may be controlled using gate bias voltages and/or drain supply voltages provided by the power supply and bias circuitry 350 to each amplifier stage 344, 346. More specifically, power supply and bias circuitry 350 provides bias and supply voltages to each RF amplifier stage 344, 346 in accordance with control signals received from system controller 330.

In an embodiment, each amplifier stage 344, 346 is implemented as a power transistor, such as a field effect transistor (FET), having an input terminal (e.g., a gate or control terminal) and two current carrying terminals (e.g., source and drain terminals). Impedance matching circuits (not illustrated) may be coupled to the input (e.g., gate) of the driver amplifier stage 344, between the driver and final amplifier stages 346, and/or to the output (e.g., drain terminal) of the final amplifier stage 346, in various embodiments. In an embodiment, each transistor of the amplifier stages 344, 346 includes a laterally diffused metal oxide semiconductor FET (LDMOSFET) transistor. However, it should be noted that the transistors are not intended to be limited to any particular semiconductor technology, and in other embodiments, each transistor may be realized as a high electron mobility transistor (HFET) (e.g., a gallium nitride (GaN) transistor), another type of MOSFET transistor, a bipolar junction transistor (BJT), or a transistor utilizing another semiconductor technology.

In FIG. 3, the power amplifier arrangement is depicted to include two amplifier stages 344, 346 coupled in a particular manner to other circuit components. In other embodiments, the power amplifier arrangement may include other amplifier topologies and/or the amplifier arrangement may include only one amplifier stage, or more than two amplifier stages. For example, the power amplifier arrangement may include various embodiments of a single ended amplifier, a double ended amplifier, a push-pull amplifier, a Doherty amplifier, a Switch Mode Power Amplifier (SMPA), or another type of amplifier.

Power detection circuitry 380 is coupled along the transmission path 348 between the output of the RF signal source 340 and the input to the variable impedance matching network 360, in an embodiment. In an alternate embodiment, power detection circuitry 380 may be coupled to the transmission path 349 between the output of the variable impedance matching network 360 and the first electrode 370. Either way, power detection circuitry 380 is configured to monitor, measure, or otherwise detect the power of the forward signals (i.e., from RF signal source 340 toward first electrode 370) and/or the reflected signals (i.e., from first electrode 370 toward RF signal source 340) traveling along the transmission path 348. In some embodiments, the power detection circuitry 380 may detect both the magnitude and the phase of the power of the forward signals and the reflected signals traveling along the transmission path 348.

Power detection circuitry 380 supplies signals conveying the magnitudes of the forward and/or reflected signal power to system controller 330. In some embodiments, power detection circuitry 380 may also supply signals conveying the phase of the forward and/or reflected signal power to the system controller 330. System controller 330, in turn, may calculate a ratio of reflected signal power to forward signal power, or the S11 parameter. Alternatively, the system controller 330 may simply calculate the magnitude of reflected signal power. As will be described in more detail below, when the reflected to forward power ratio or the reflected power magnitude exceeds a threshold, this indicates that the system 300 is not adequately matched, and that energy absorption by the load 316 may be sub-optimal. In such a situation, system controller 330 orchestrates a process of altering the state of the variable impedance matching network until the reflected to forward power ratio or the reflected power magnitude decreases to a desired level, thus re-establishing an acceptable match and facilitating more optimal energy absorption by the load 316.

As mentioned above, some embodiments of defrosting system 300 may include temperature sensor(s), IR sensor(s), and/or weight sensor(s) 390. The temperature sensor(s) and/or IR sensor(s) may be positioned in locations that enable the temperature of the load 316 to be sensed during the defrosting operation. When provided to the system controller 330, the temperature information enables the system controller 330 to alter the power of the RF signal supplied by the RF signal source 340 (e.g., by controlling the bias and/or supply voltages provided by the power supply and bias circuitry 350), to adjust the state of the variable impedance matching network 360, and/or to determine when the defrosting operation should be terminated. The weight sensor(s) are positioned under the load 316, and are configured to provide an estimate of the weight of the load 316 to the system controller 330. The system controller 330 may use this information, for example, to determine a desired power level for the RF signal supplied by the RF signal source 340, to determine an initial setting for the variable impedance matching network 360, and/or to determine an approximate duration for the defrosting operation.

As discussed above, the variable impedance matching network 360 is used to match the input impedance of the defrosting cavity 310 plus load 316 to maximize, to the extent possible, the RF power transfer into the load 316. The initial impedance of the defrosting cavity 310 and the load 316 may not be known with accuracy at the beginning of a defrosting operation. Further, the impedance of the load 316 changes during a defrosting operation as the load 316 warms up. According to an embodiment, the system controller 330 may provide control signals to the variable impedance matching network 360, which cause modifications to the state of the variable impedance matching network 360. This enables the system controller 330 to establish an initial state of the variable impedance matching network 360 at the beginning of the defrosting operation that has a relatively low reflected to forward power ratio or reflected power magnitude, and thus a relatively high absorption of the RF power by the load 316. In addition, this enables the system controller 330 to modify the state of the variable impedance matching network 360 so that an adequate match may be maintained throughout the defrosting operation, despite changes in the impedance of the load 316.

According to an embodiment, the variable impedance matching network 360 may include a network of passive components, and more specifically a network of fixed-value inductors (e.g., lumped inductive components) and variable inductors (or variable inductance networks). As used herein, the term "inductor" means a discrete inductor or a set of inductive components that are electrically coupled together without intervening components of other types (e.g., resistors or capacitors).

Figure 4:
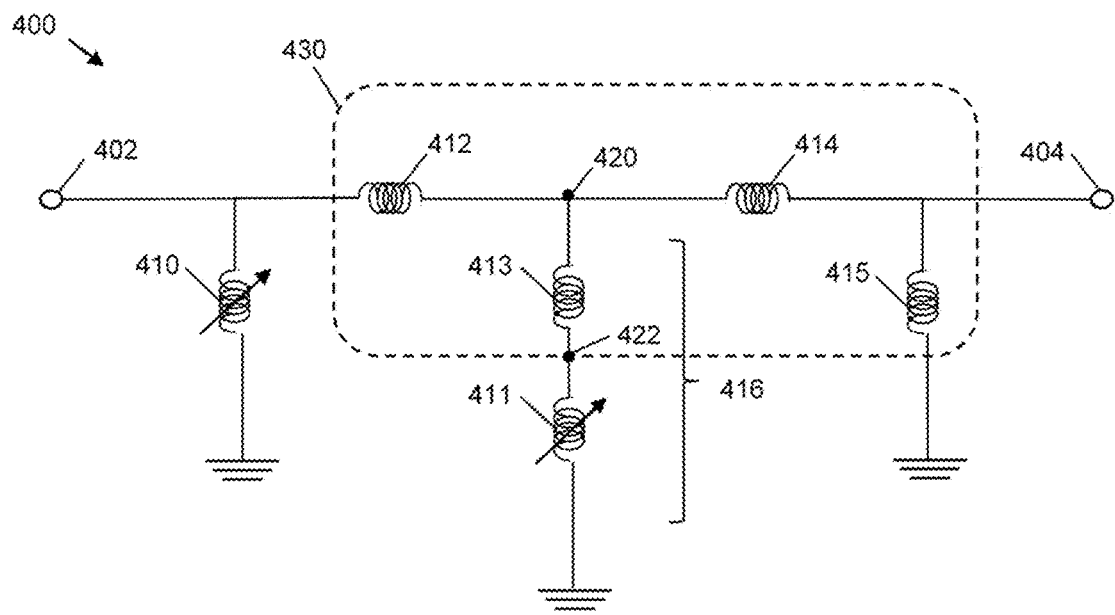
FIG. 4 is a schematic diagram of a variable inductance matching network, in accordance with an example embodiment.

FIG. 4 is a schematic diagram of a variable impedance matching network 400 (e.g., variable impedance matching network 360, FIG. 3), in accordance with an example embodiment. As will be explained in more detail below, the variable impedance matching network 360 essentially has two portions: one portion to match the RF signal source (or the final stage power amplifier); and another portion to match the cavity plus load.

Variable impedance matching network 400 includes an input node 402, an output node 404, first and second variable inductance networks 410, 411, and a plurality of fixed-value inductors 412-415, according to an embodiment. When incorporated into a defrosting system (e.g., system 300, FIG. 3), the input node 402 is electrically coupled to an output of the RF signal source (e.g., RF signal source 340, FIG. 3), and the output node 404 is electrically coupled to an electrode (e.g., electrode 370, 770, FIGS. 3, 7, or electrode 772, FIG. 7) within the defrosting cavity (e.g., defrosting cavity 310, 774, FIGS. 3, 7).

Between the input and output nodes 402, 404, the variable impedance matching network 400 includes first and second, series coupled fixed-value inductors 412, 414, in an embodiment. The first and second fixed-value inductors 412, 414 are relatively large in both size and inductance value, in an embodiment, as they may be designed for relatively low frequency (e.g., about 4.66 MHz to about 4.68 MHz) and high power (e.g., about 50 watts (W) to about 500 W) operation. For example, inductors 412, 414 may have values in a range of about 200 nanohenries (nH) to about 600 nH, although their values may be lower and/or higher, in other embodiments.

The first variable inductance network 410 is a first shunt inductive network that is coupled between the input node 402 and a ground reference terminal (e.g., the grounded containment structure 312, FIG. 3). According to an embodiment, the first variable inductance network 410 is configurable to match the impedance of the RF signal source (e.g., RF signal source 340, FIG. 3), or more particularly to match the final stage power amplifier (e.g., amplifier 346, FIG. 3). Accordingly, the first variable inductance network 410 may be referred to as the "power amplifier matching portion" of the variable impedance matching network 400. According to an embodiment, and as will be described in more detail in conjunction with FIG. 5, the first variable inductance network 410 includes a network of inductive components that may be selectively coupled together to provide inductances in a range of about 20 nH to about 400 nH, although the range may extend to lower or higher inductance values, as well.

In contrast, the "cavity matching portion" of the variable impedance matching network 400 is provided by a second shunt inductive network 416 that is coupled between a node 420 between the first and second fixed-value inductors 412, 414 and the ground reference terminal. According to an embodiment, the second shunt inductive network 416 includes a third fixed value inductor 413 and a second variable inductance network 411 coupled in series, with an intermediate node 422 between the third fixed-value inductor 413 and the second variable inductance network 411. Because the state of the second variable inductance network 411 may be changed to provide multiple inductance values, the second shunt inductive network 416 is configurable to optimally match the impedance of the cavity plus load (e.g., cavity 310 plus load 316, FIG. 3). For example, inductor 413 may have a value in a range of about 400 nH to about 800 nH, although its value may be lower and/or higher, in other embodiments. According to an embodiment, and as will be described in more detail in conjunction with FIG. 5, the second variable inductance network 411 includes a network of inductive components that may be selectively coupled together to provide inductances in a range of about 50 nH to about 800 nH, although the range may extend to lower or higher inductance values, as well.

Finally, the variable impedance matching network 400 includes a fourth fixed-value inductor 415 coupled between the output node 404 and the ground reference terminal. For example, inductor 415 may have a value in a range of about 400 nH to about 800 nH, although its value may be lower and/or higher, in other embodiments.

As will be described in more detail in conjunction with FIGS. 7 and 8, the set 430 of fixed-value inductors 412-415 may be physically located within the cavity (e.g., cavity 310, FIG. 3), or at least within the confines of the containment structure (e.g., containment structure 312, FIG. 3). This enables the radiation produced by the fixed-value inductors 412-415 to be contained within the system, rather than being radiated out into the surrounding environment. In contrast, the variable inductance networks 410, 411 may or may not be contained within the cavity or the containment structure, in various embodiments.

According to an embodiment, the variable impedance matching network 400 embodiment of FIG. 4 includes "only inductors" to provide a match for the input impedance of the defrosting cavity 310 plus load 316. Thus, the network 400 may be considered an "inductor-only" matching network. As used herein, the phrases "only inductors" or "inductor-only" when describing the components of the variable impedance matching network means that the network does not include discrete resistors with significant resistance values or discrete capacitors with significant capacitance values. In some cases, conductive transmission lines between components of the matching network may have minimal resistances, and/or minimal parasitic capacitances may be present within the network. Such minimal resistances and/or minimal parasitic capacitances are not to be construed as converting embodiments of the "inductor-only" network into a matching network that also includes resistors and/or capacitors. Those of skill in the art would understand, however, that other embodiments of variable impedance matching networks may include differently configured inductor-only matching networks, and matching networks that include combinations of discrete inductors, discrete capacitors, and/or discrete resistors. As will be described in more detail in conjunction with FIG. 6, an "inductor-only" matching network alternatively may be defined as a matching network that enables impedance matching of a capacitive load using solely or primarily inductive components.

Figure 5:
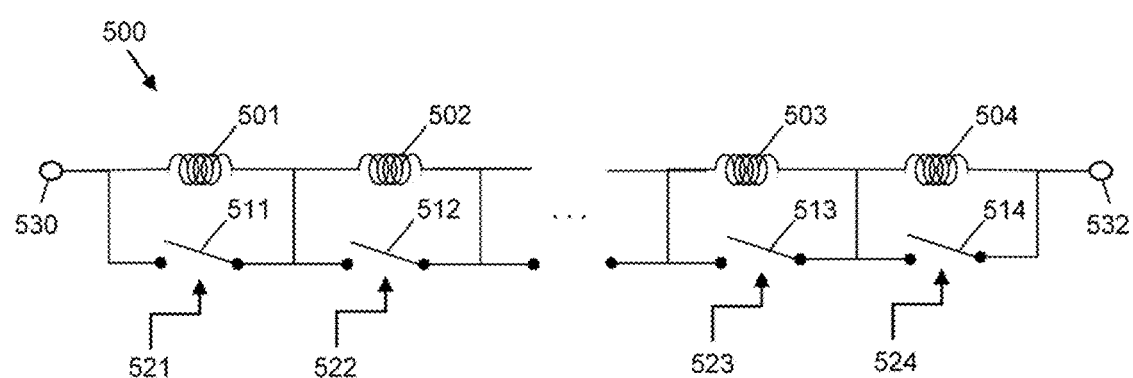
FIG. 5 is a schematic diagram of a variable inductance network, in accordance with an example embodiment.

FIG. 5 is a schematic diagram of a variable inductance network 500 that may be incorporated into a variable impedance matching network (e.g., as variable inductance networks 410 and/or 411, FIG. 4), in accordance with an example embodiment. Network 500 includes an input node 530, an output node 532, and a plurality, N, of discrete inductors 501-504 coupled in series with each other between the input and output nodes 530, 523, where N may be an integer between 2 and 10, or more. In addition, network 500 includes a plurality, N, of switches 511-514, where each switch 511-514 is coupled in parallel across the terminals of one of the inductors 501-504. Switches 511-514 may be implemented as transistors, mechanical relays or mechanical switches, for example. The electrically conductive state of each switch 511-514 (i.e., open or closed) is controlled using control signals 521-524 from the system controller (e.g., system controller 330, FIG. 3).

For each parallel inductor/switch combination, substantially all current flows through the inductor when its corresponding switch is in an open or non-conductive state, and substantially all current flows through the switch when the switch is in a closed or conductive state. For example, when all switches 511-514 are open, as illustrated in FIG. 5, substantially all current flowing between input and output nodes 530, 532 flows through the series of inductors 501-504. This configuration represents the maximum inductance state of the network 500 (i.e., the state of network 500 in which a maximum inductance value is present between input and output nodes 530, 532). Conversely, when all switches 511-514 are closed, substantially all current flowing between input and output nodes 530, 532 bypasses the inductors 501-504 and flows instead through the switches 511-514 and the conductive interconnections between nodes 530, 532 and switches 511-514. This configuration represents the minimum inductance state of the network 500 (i.e., the state of network 500 in which a minimum inductance value is present between input and output nodes 530, 532). Ideally, the minimum inductance value would be near zero inductance. However, in practice a "trace" inductance is present in the minimum inductance state due to the cumulative inductances of the switches 511-514 and the conductive interconnections between nodes 530, 532 and the switches 511-514. For example, in the minimum inductance state, the trace inductance for the variable inductance network 500 may be in a range of about 20 nH to about 50 nH, although the trace inductance may be smaller or larger, as well. Larger, smaller, or substantially similar trace inductances also may be inherent in each of the other network states, as well, where the trace inductance for any given network state is a summation of the inductances of the sequence of conductors and switches through which the current primarily is carried through the network 500.

the nearest downstream inductor 501-503, although the difference may not necessarily be an integer multiple. In such an embodiment, the state of the network 500 may be configured to have any of $2^N$ values of inductance. For example, when N=4 and each inductor 501-504 has a different value, the network 500 may be configured to have any of 16 values of inductance. For example but not by way of limitation, assuming that inductor 501 has a value of I, inductor 502 has a value of 2×I, inductor 503 has a value of 4×I, and inductor 504 has a value of 8×I, Table 1–Total inductance values for all possible variable inductance network states, below indicates the total inductance value for all 16 possible states of the network 500 (not accounting for trace inductances):

TABLE 1

Total inductance values for all possible variable inductance network states

| Network state | Switch 511 state (501 value = I) | Switch 512 state (502 value = 2 × I) | Switch 513 state (503 value = 4 × I) | Switch 514 state (504 value = 8 × I) | Total network inductance (w/o trace inductance) |
|---|---|---|---|---|---|
| 0 | closed | closed | closed | closed | 0 |
| 1 | open | closed | closed | closed | I |
| 2 | closed | open | closed | closed | 2 × I |
| 3 | open | open | closed | closed | 3 × I |
| 4 | closed | closed | open | closed | 4 × I |
| 5 | open | closed | open | closed | 5 × I |
| 6 | closed | open | open | closed | 6 × I |
| 7 | open | open | open | closed | 7 × I |
| 8 | closed | closed | closed | open | 8 × I |
| 9 | open | closed | closed | open | 9 × I |
| 10 | closed | open | closed | open | 10 × I |
| 11 | open | open | closed | open | 11 × I |
| 12 | closed | closed | open | open | 12 × I |
| 13 | open | closed | open | open | 13 × I |
| 14 | closed | open | open | open | 14 × I |
| 15 | open | open | open | open | 15 × I |

Starting from the maximum inductance state in which all switches 511-514 are open, the system controller may provide control signals 521-524 that result in the closure of any combination of switches 511-514 in order to reduce the inductance of the network 500 by bypassing corresponding combinations of inductors 501-504. In one embodiment, each inductor 501-504 has substantially the same inductance value, referred to herein as a normalized value of I. For example, each inductor 501-504 may have a value in a range of about 100 nH to about 200 nH, or some other value. In such an embodiment, the maximum inductance value for the network 500 (i.e., when all switches 511-514 are in an open state) would be about N×I, plus any trace inductance that may be present in the network 500 when it is in the maximum inductance state. When any n switches are in a closed state, the inductance value for the network 500 would be about (N−n)×I (plus trace inductance). In such an embodiment, the state of the network 500 may be configured to have any of N+1 values of inductance.

In an alternate embodiment, the inductors 501-504 may have different values from each other. For example, moving from the input node 530 toward the output node 532, the first inductor 501 may have a normalized inductance value of I, and each subsequent inductor 502-504 in the series may have a larger or smaller inductance value. For example, each subsequent inductor 502-504 may have an inductance value that is a multiple (e.g., about twice) the inductance value of Although the above example embodiment specifies that the number of switched inductances in the network 500 equals four, and that each inductor 501-504 has a value that is some multiple of a value of I, alternate embodiments of variable inductance networks may have more or fewer than four inductors, different relative values for the inductors, a different number of possible network states, and/or a different configuration of inductors (e.g., differently connected sets of parallel and/or series coupled inductors). Either way, by providing a variable inductance network in an impedance matching network of a defrosting system, the system may be better able to match the ever-changing cavity input impedance that is present during a defrosting operation.

Figure 6:
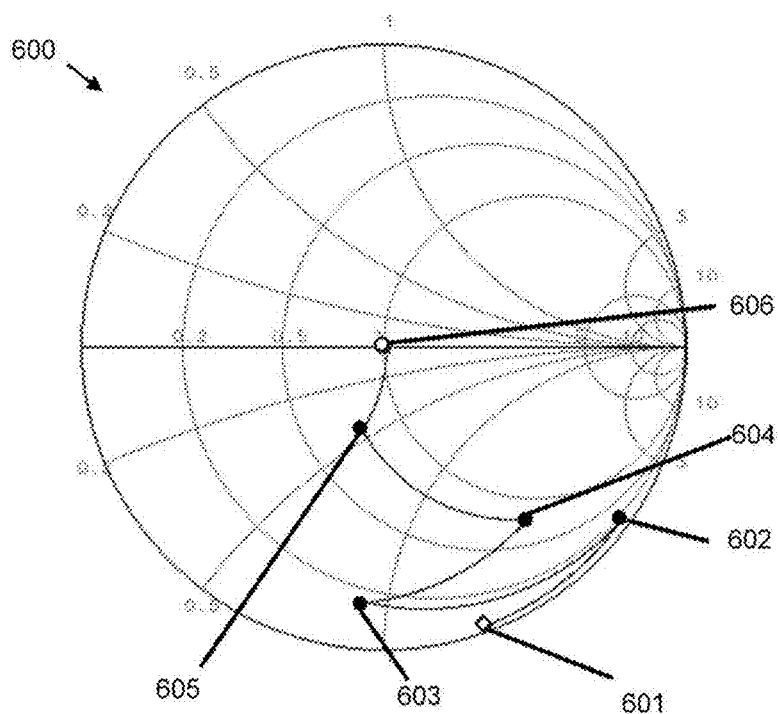
FIG. 6 is an example of a Smith chart depicting how a plurality of inductances in an embodiment of a variable impedance matching network may match the input cavity impedance to an RF signal source.

FIG. 6 is an example of a Smith chart 600 depicting how the plurality of inductances in an embodiment of a variable impedance matching network (e.g., network 360, 400, FIGS. 3, 4) may match the input cavity impedance to the RF signal source. The example Smith chart 600 assumes that the system is a 50 Ohm system, and that the output of the RF signal source is 50 Ohms. Those of skill in the art would understand, based on the description herein, how the Smith chart could be modified for a system and/or RF signal source with different characteristic impedances.

In Smith chart 600, point 601 corresponds to the point at which the load (e.g., the cavity 310 plus load 316, FIG. 3) would locate (e.g., at the beginning of a defrosting operation) absent the matching provided by the variable impedance matching network (e.g., network 360, 400, FIGS. 3, 4). As indicated by the position of the load point 601 in the lower right quadrant of the Smith chart 600, the load is a capacitive load. According to an embodiment, the shunt and series inductances of the variable impedance matching network sequentially move the substantially-capacitive load impedance toward an optimal matching point 606 (e.g., 50 Ohms) at which RF energy transfer to the load may occur with minimal losses. More specifically, and referring also to FIG. 4, shunt inductance 415 moves the impedance to point 602, series inductance 414 moves the impedance to point 603, shunt inductance 416 moves the impedance to point 604, series inductance 412 moves the impedance to point 605, and shunt inductance 410 moves the impedance to the optimal matching point 606.

It should be noted that the combination of impedance transformations provided by embodiments of the variable impedance matching network keep the impedance at any point within or very close to the lower right quadrant of the Smith chart 600. As this quadrant of the Smith chart 600 is characterized by relatively high impedances and relatively low currents, the impedance transformation is achieved without exposing components of the circuit to relatively high and potentially damaging currents. Accordingly, an alternate definition of an "inductor-only" matching network, as used herein, may be a matching network that enables impedance matching of a capacitive load using solely or primarily inductive components, where the impedance matching network performs the transformation substantially within the lower right quadrant of the Smith chart.

As discussed previously, the impedance of the load changes during the defrosting operation. Accordingly, point 601 correspondingly moves during the defrosting operation. Movement of load point 601 is compensated for, according to the previously-described embodiments, by varying the impedance of the first and second shunt inductances 410, 411 so that the final match provided by the variable impedance matching network still may arrive at or near the optimal matching point 606. Although a specific variable impedance matching network has been illustrated and described herein, those of skill in the art would understand, based on the description herein, that differently-configured variable impedance matching networks may achieve the same or similar results to those conveyed by Smith chart 600. For example, alternative embodiments of a variable impedance matching network may have more or fewer shunt and/or series inductances, and or different ones of the inductances may be configured as variable inductance networks (e.g., including one or more of the series inductances). Accordingly, although a particular variable inductance matching network has been illustrated and described herein, the inventive subject matter is not limited to the illustrated and described embodiment.

A particular physical configuration of a defrosting system will now be described in conjunction with FIGS. 7 and 8. More particularly, FIG. 7 is a cross-sectional, side view of a defrosting system 700, in accordance with an example embodiment, and FIG. 8 is a perspective view of a portion of defrosting system 700. It should be noted that some portions the defrosting system 700 shown in FIGS. 7 and 8 may not be drawn to scale so that components of the defrosting system 700 may be depicted more clearly. The defrosting system 700 generally includes a defrosting cavity 774 (sometimes referred to herein as air cavity 774), a user interface (not shown), a system controller 730, an RF signal source 740, power supply and bias circuitry (not shown), power detection circuitry 780, a variable impedance matching network 760, a first electrode 770, and a second electrode 772, in an embodiment. In addition, in some embodiments, defrosting system 700 may include weight sensor(s) 790, temperature sensor(s), and/or IR sensor(s) 792.

The defrosting system 700 is contained within a containment structure 750, in an embodiment. According to an embodiment, the containment structure 750 may define three interior areas: the defrosting cavity 774 (e.g., cavity 310, FIG. 3), a fixed inductor area 776, and a circuit housing area 778. The containment structure 750 includes bottom, top, and side walls. Portions of the interior surfaces of some of the walls of the containment structure 750 may define the defrosting cavity 774. The defrosting cavity 774 includes a capacitive defrosting arrangement with first and second parallel plate electrodes 770, 772 that are separated by an air cavity 774 within which a load 716 to be defrosted may be placed. For example, the first electrode 770 (e.g., electrode 370, FIG. 3) may be positioned above the air cavity 774, and a second electrode 772 may, for example, be provided by a conductive portion of containment structure 750. Alternatively, the second electrode 772 may be formed from a conductive plate that is distinct from the containment structure 750, which may be disposed below or embedded in a non-conductive barrier 756. First electrode 770 may be formed as part of a wall (e.g., top wall 111, FIG. 1) or a shelf (e.g., shelf 216, 226, FIG. 2) into which a drawer may be inserted or otherwise physically engaged. According to an embodiment, non-electrically conductive support structure(s) 754 may be employed to suspend the first electrode 770 above the air cavity, to electrically isolate the first electrode 770 from the containment structure 750, and to hold the first electrode 770 in a fixed physical orientation with respect to the air cavity 774.

According to an embodiment, the containment structure 750 is at least partially formed from conductive material, and the conductive portion(s) of the containment structure may be grounded to provide a ground reference structure for various electrical components of the system. The second electrode 772, which may be formed from a portion of the containment structure 750 or may be a structure distinct from the containment structure 750, may be formed from conductive material and grounded. Alternatively, the second electrode 772 may be electrically coupled to a power supply and set to a constant voltage (e.g., a negative voltage) or may receive an oscillating voltage signal (e.g., an RF signal that is an inverse of the RF signal produced by the RF signal source 740). To avoid direct contact between the load 716 and the second electrode 772, non-conductive barrier 756 may be positioned over the second electrode 772.

When included in the system 700, the weight sensor(s) 790 may be positioned under the load 716 directly. The weight sensor(s) 790 are configured to provide an estimate of the weight of the load 716 to the system controller 730. The temperature sensor(s) and/or IR sensor(s) 792 may be positioned in locations that enable the temperature of the load 716 to be sensed both before, during, and after a defrosting operation. According to an embodiment, the temperature sensor(s) and/or IR sensor(s) 792 are configured to provide load temperature estimates to the system controller 730.

Some or all of the various components of the system controller 730, the RF signal source 740, the power supply and bias circuitry (not shown), the power detection circuitry 780, and portions 710, 711 of the variable impedance matching network 760, may be coupled to a common substrate 752 within the circuit housing area 778 of the containment structure 750, in an embodiment. According to an embodiment, the system controller 730 is coupled to the user interface, RF signal source 740, variable impedance matching network 760, and power detection circuitry 780 through various conductive interconnects on or within the common substrate 752. In addition, the power detection circuitry 780 is coupled along the transmission path 748 between the output of the RF signal source 740 and the input 702 to the variable impedance matching network 760, in an embodiment. For example, the substrate 752 may include a microwave or RF laminate, a polytetrafluoroethylene (PTFE) substrate, a printed circuit board (PCB) material substrate (e.g., FR-4), an alumina substrate, a ceramic tile, or another type of substrate. In various alternate embodiments, various ones of the components may be coupled to different substrates with electrical interconnections between the substrates and components. In still other alternate embodiments, some or all of the components may be coupled to a cavity wall, rather than being coupled to a distinct substrate.

The first electrode 770 is electrically coupled to the RF signal source 740 through a variable impedance matching network 760 and a transmission path 748, in an embodiment. As discussed previously, the variable impedance matching network 760 includes variable inductance networks 710, 711 (e.g., networks 410, 411, FIG. 4) and a plurality of fixed-value inductors 712-715 (e.g., inductors 412-415, FIG. 4). In an embodiment, the variable inductance networks 710, 711 are coupled to the common substrate 752 and located within the circuit housing area 778. In contrast, the fixed-value inductors 712-715 are positioned within the fixed inductor area 776 of the containment structure 750 (e.g., between the common substrate 752 and the first electrode 770). Conductive structures (e.g., conductive vias or other structures) may provide for electrical communication between the circuitry within the circuit housing area 778 and the fixed-value inductors 712-715 within the fixed inductor area 776.

As load 716 is heated, the impedance of load 716 may change, which can be compensated for by adjusting the inductance of the variable inductance networks 710, 711. In order to reduce the amount by which the variable inductance networks 710, 711 must be tuned to compensate for changes in the impedance of load 716 during RF heating operations, a capacitor may be included in parallel with the capacitor formed by the first electrode 770 and the second electrode 772. To provide such a capacitor, fixed inductor area 776 may include a conductive plate 784 (sometimes referred to as a conductive structure) that is capacitively coupled to at least a portion of the first electrode 770 to form an in-cavity capacitor 785. The in-cavity capacitor 785 may be connected in parallel with the capacitor formed from the first electrode 770 and the second electrode 772, and in this way may reduce the inductance ranges of the variable inductance networks 710, 711 required to tune the impedance of the path between the source of the RF signal source 740 and the first electrode 770. Conductive plate 784 may, for example, be formed from a metal with good electrical conductivity, such as copper. In some embodiments, conductive plate 784 may be disposed overlapping only a portion of first electrode 770. The conductive plate 784 is disposed a distance from the first electrode 770, and dielectric material 781 may be interposed directly between conductive plate 784 and first electrode 770. Dielectric material 781 may, for example, be polytetrafluoroethylene (PTFE), ceramic, or another material with a relatively low dielectric constant (e.g., low-k; k<3.9) and low dielectric loss (e.g., low dissipation factor; DF), so that the capacitor formed by conductive plate 784 and first electrode 770 may have a relatively high quality factor (Q-factor) compared to otherwise equivalent capacitors having comparatively higher dielectric constants and/or dielectric DFs. In one embodiment, dielectric material 781 may have a thickness within a range from about 3 millimeters (mm) to about 10 mm. In some embodiments, dielectric material 781 may include a combination of multiple dielectrics having different dielectric constants, such as both PTFE and air. By including a dielectric having a greater breakdown voltage than air, such as PTFE, in dielectric material 781, high voltage arcing between conductive plate 784 and first electrode 770 may be prevented. As used here, the breakdown voltage of a dielectric is defined as the minimum voltage required to cause a portion of the dielectric to become electrically conductive. In-cavity capacitor 785 may, for example, have a capacitance ranging from about 1 picofarad (pF) to about 100 pF, although in-cavity capacitor 785 may have a lower or higher capacitance value, as well.

Conductive plate 784 may be electrically coupled to containment structure 750 through a conductive bridge 782, and may be electrically grounded thereby (e.g., when the containment structure 750 is grounded). In other embodiments, the conductive plate 784 may be otherwise electrically grounded (e.g., by electrically coupling the conductive plate 784 to some other ground reference structure). Conductive bridge 782 may have a proximal end that is aligned in parallel with conductive plate 784 and that is attached (e.g., welded, or otherwise electrically and physically coupled) to containment structure 750. Conductive bridge 782 may have a distal end 783 that is arranged perpendicularly to the proximal end and to conductive plate 784, and that is attached (e.g., welded, or otherwise electrically and physically coupled) to conductive plate 784. It should be noted that the arrangement of conductive plate 784 and conductive bridge 782 is intended to be illustrative and not limiting. Other arrangements are possible, for example, in which conductive plate 784 is welded directly to containment structure 750, or in which conductive plate 784 is mechanically movable such that the distance between conductive plate 784 and first electrode 770 may be selectively increased or decreased, thereby also selectively increasing or decreasing the amount of air acting as a dielectric between conductive plate 784 and first electrode 770 and effectively altering the capacitance of in-cavity capacitor 785. The mechanical motion of the latter example may be enabled through an electrically driven motor or any other appropriate prime mover. For example, a user may have the option to adjust the capacitance of in-cavity capacitor 785 by providing an input (e.g., by entering a desired capacitance value). In response to this input, conductive plate 784 may be moved closer to or further away from first electrode 770 (e.g., by the enabling motor or other prime mover) until the desired capacitance value has been achieved for in-cavity capacitor 785 (e.g., within a predefined tolerance). The dielectric material 781 may be in direct contact with the first electrode 770, and in a minimum capacitance state, the conductive plate 784 may be in direct contact with the dielectric material 781. In such a configuration, the in-cavity capacitor includes the conductive plate 784, the dielectric material 781, and the portion of the first electrode 770 that is overlapped by the conductive plate 784. When the conductive plate 784 is moved farther from the first electrode 770 and separates from the dielectric material 781, then the in-cavity capacitor includes the conductive plate 784, the portion of the first electrode 770 that is overlapped by the conductive plate 784, a first dielectric in the form of the dielectric material 781 between the conductive plate 784 and the first electrode 770, and a second dielectric (i.e., air) interposed between the first dielectric material 781 and the conductive plate 784. It should be noted that the first dielectric (e.g., PTFE) has a different dielectric constant than the second dielectric (e.g., air).

The inclusion of the in-cavity capacitor 785 in the system 700, may permit the variable inductance networks 710, 711 to have a smaller range of achievable inductances, which may reduce the size and/or complexity of the inductance networks 710, 711.

Figure 7:
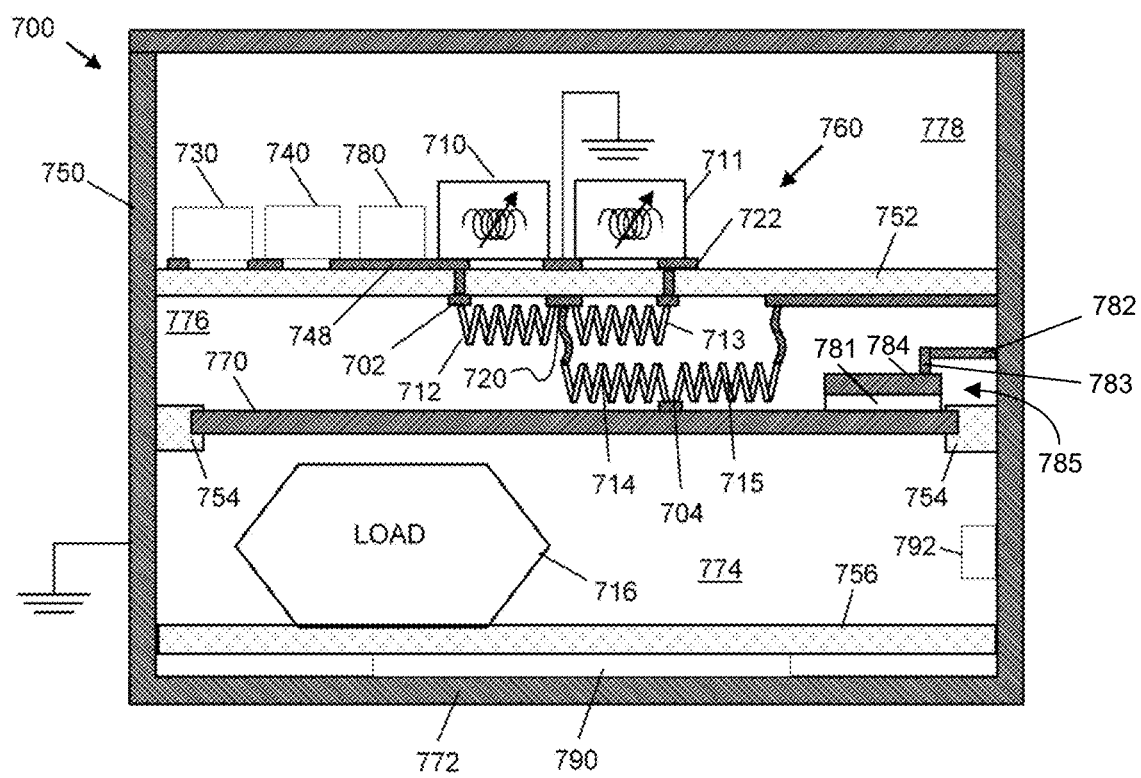
FIG. 7 is a cross-sectional, side view of a defrosting system, in accordance with an example embodiment.
Figure 8:
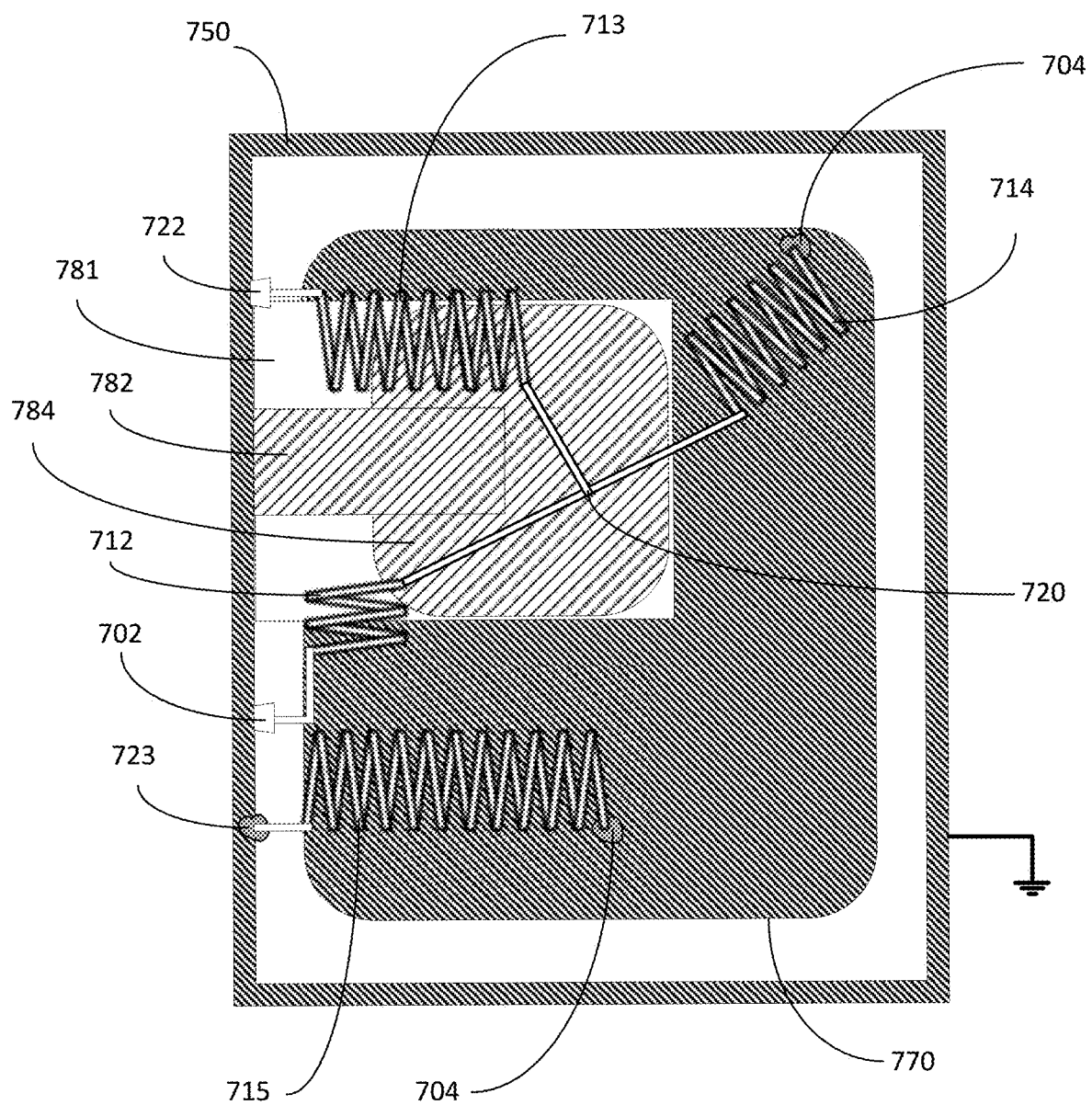
FIG. 8 is a perspective view of a portion of a defrosting system, in accordance with an example embodiment.

For enhanced understanding of the system 700, the nodes and components of the variable impedance matching network 760 depicted in FIGS. 7 and 8 will now be correlated with nodes and components of the variable impedance matching network 400 depicted in FIG. 4. More specifically, the variable impedance matching network 760 includes an input node 702 (e.g., input node 402, FIG. 4), an output node 704 (e.g., output node 404, FIG. 4), first and second variable inductance networks 710, 711 (e.g., variable inductance networks 410, 411, FIG. 4), and a plurality of fixed-value inductors 712-715 (e.g., inductors 412-415, FIG. 4), according to an embodiment. The input node 702 is electrically coupled to an output of the RF signal source 740 through various conductive structures (e.g., conductive vias and traces), and the output node 704 is electrically coupled to the first electrode 770.

Between the input and output nodes 702, 704 (e.g., input and output nodes 402, 404, FIG. 4), system 700 includes four fixed-value inductors 712-715 (e.g., inductors 412-415, FIG. 4), in an embodiment, which are positioned within the fixed inductor area 776. An enhanced understanding of an embodiment of a physical configuration of the fixed-value inductors 712-715 within the fixed inductor area 776 may be achieved by referring to both FIG. 7 and to FIG. 8 simultaneously, where FIG. 8 depicts a top perspective view of the fixed inductor area 776.

In an embodiment, the first fixed-value inductor 712 has a first terminal that is electrically coupled to the input node 702 (and thus to the output of RF signal source 740), and a second terminal that is electrically coupled to a first intermediate node 720 (e.g., node 420, FIG. 4). The second fixed-value inductor 713 has a first terminal that is electrically coupled to the first intermediate node 720, and a second terminal that is electrically coupled to a second intermediate node 722 (e.g., node 422, FIG. 4). The third fixed-value inductor 714 has a first terminal that is electrically coupled to the first intermediate node 720, and a second terminal that is electrically coupled to the output node 704 (and thus to the first electrode 770). The fourth fixed-value inductor 715 has a first terminal that is electrically coupled to the output node 704 (and thus to the first electrode 770), and a second terminal that is electrically coupled to a ground reference node 723 (e.g., to the grounded containment structure 750 through one or more conductive interconnects). It should be noted that the first intermediate node 720 is not in contact with conductive plate 784, and is instead suspended in the space over conductive plate 784 in FIG. 7. Rather than relying on an air dielectric, non-electrically conductive spacers (not shown) may be included in areas where inductors 712-715 overlap conductive plate 784 and/or first electrode 770.

The first variable inductance network 710 (e.g., network 410, FIG. 4) is electrically coupled between the input node 702 and a ground reference terminal (e.g., the grounded containment structure 750). Finally, the second shunt inductive network 711 is electrically coupled between the second intermediate node 722 and the ground reference terminal.

Figure 9:
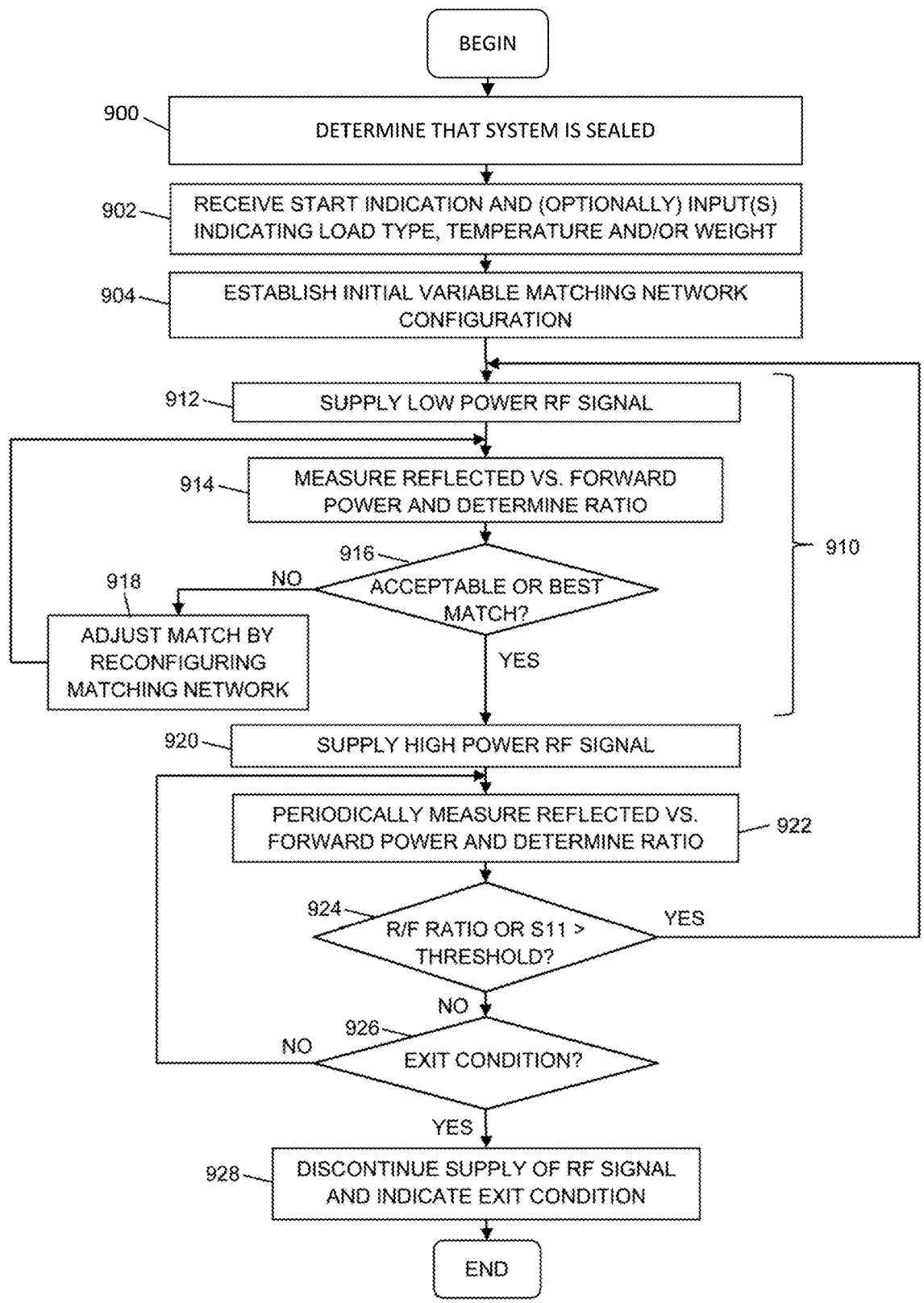
FIG. 9 is a flowchart of a method of operating a defrosting system with dynamic load matching, in accordance with an example embodiment.

Now that embodiments of the electrical and physical aspects of defrosting systems have been described, various embodiments of methods for operating such defrosting systems will now be described. More specifically, FIG. 9 is a flowchart of a method of operating a defrosting system (e.g., system 100, 210, 220, 300, 700, FIGS. 1-3, 7) with dynamic load matching, in accordance with an example embodiment.

The method may begin, in block 900, when a user places a load (e.g., load 316, FIG. 3) into the system's defrosting cavity (e.g., cavity 310, FIG. 3), and seals the cavity (e.g., by closing the drawer/door). In an embodiment, sealing of the cavity may engage one or more safety interlock mechanisms, which when engaged, indicate that RF power supplied to the cavity will not substantially leak into the environment outside of the cavity. As will be described later, disengagement of a safety interlock mechanism may cause the system controller immediately to pause or terminate the defrosting operation.

In block 900, the system controller (e.g., system controller 330, FIG. 3) receives an indication that the system has been sealed. For example, the system (e.g., the defrosting cavity of the system) may be sealed by fully inserting a drawer (e.g., drawer 218, 228, FIG. 2) into a containment structure (e.g., such that the drawer is physically engaged with the containment structure) under a shelf (e.g., shelf 216, 226, FIG. 2) which may form a portion of the containment structure, or by closing a door (e.g., door 116, FIG. 1) to fully enclose the cavity. This indication may be, for example, an electrical signal provided by a safety interlock disposed in or on the containment structure.

In block 902, the system controller (e.g., system controller 330, FIG. 3) receives an indication that a defrosting operation should start. Such an indication may be received, for example, when the user has pressed a start button (e.g., of the user interface 320, FIG. 3). According to various embodiments, the system controller optionally may receive additional inputs indicating the load type (e.g., meats, liquids, or other materials), the initial load temperature, and/or the load weight. For example, information regarding the load type may be received from the user through interaction with the user interface (e.g., by the user selecting from a list of recognized load types). Alternatively, the system may be configured to scan a barcode visible on the exterior of the load, or to receive an electronic signal from an RFID device on or embedded within the load. Information regarding the initial load temperature may be received, for example, from one or more temperature sensors and/or IR sensors (e.g., sensors 390, 792, FIGS. 3, 7) of the system. Information regarding the load weight may be received from the user through interaction with the user interface, or from a weight sensor (e.g., sensor 390, 790, FIGS. 3, 7) of the system. As indicated above, receipt of inputs indicating the load type, initial load temperature, and/or load weight is optional, and the system alternatively may not receive some or all of these inputs.

In block 904, the system controller provides control signals to the variable matching network (e.g., network 360, 400, FIGS. 3, 4) to establish an initial configuration or state for the variable matching network. As described in detail in conjunction with FIGS. 4 and 5, the control signals affect the inductances of variable inductance networks (e.g., networks 410, 411, FIG. 4) within the variable matching network. For example, the control signals may affect the states of bypass switches (e.g., switches 511-514, FIG. 5), which are responsive to the control signals from the system controller (e.g., control signals 521-524, FIG. 5).

As also discussed previously, a first portion of the variable matching network may be configured to provide a match for the RF signal source (e.g., RF signal source 340, FIG. 3) or the final stage power amplifier (e.g., power amplifier 346, FIG. 3), and a second portion of the variable matching network may be configured to provide a match for the cavity (e.g., cavity 310, FIG. 3) plus the load (e.g., load 316, FIG. 3). For example, referring to FIG. 4, a first shunt, variable inductance network 410 may be configured to provide the RF signal source match, and a second shunt, variable inductance network 416 may be configured to provide the cavity plus load match.

Figure 10:
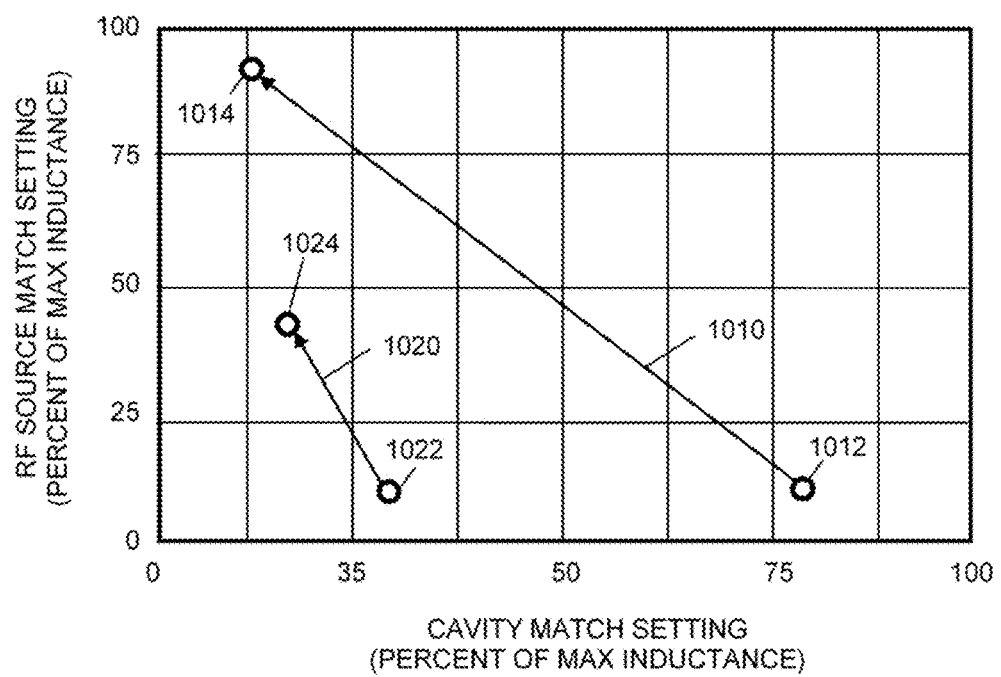
FIG. 10 is a chart plotting cavity match setting versus RF signal source match setting through a defrost operation for two different loads.

It has been observed that a best initial overall match for a frozen load (i.e., a match at which a maximum amount of RF power is absorbed by the load) typically has a relatively high inductance for the cavity matching portion of the matching network, and a relatively low inductance for the RF signal source matching portion of the matching network. For example, FIG. 10 is a chart plotting optimal cavity match setting versus RF signal source match setting through a defrost operation for two different loads, where trace 1010 corresponds to a first load (e.g., having a first type, weight, and so on), and trace 1020 corresponds to a second load (e.g., having a second type, weight, and so on). In FIG. 10, the optimal initial match settings for the two loads at the beginning of a defrost operation (e.g., when the loads are frozen) are indicated by points 1012 and 1022, respectively. As can be seen, both points 1012 and 1022 indicate relatively high cavity match settings in comparison to relatively low RF source match settings. Referring to the embodiment of FIG. 4, this translates to a relatively high inductance for variable inductance network 416, and a relatively low inductance for variable inductance network 410.

According to an embodiment, to establish the initial configuration or state for the variable matching network in block 904, the system controller sends control signals to the first and second variable inductance networks (e.g., networks 410, 411, FIG. 4) to cause the variable inductance network for the RF signal source match (e.g., network 410) to have a relatively low inductance, and to cause the variable inductance network for the cavity match (e.g., network 411) to have a relatively high inductance. The system controller may determine how low or how high the inductances are set based on load type/weight/temperature information known to the system controller a priori. If no a priori load type/weight/temperature information is available to the system controller, the system controller may select a relatively low default inductance for the RF signal source match and a relatively high default inductance for the cavity match.

Assuming, however, that the system controller does have a priori information regarding the load characteristics, the system controller may attempt to establish an initial configuration near the optimal initial matching point. For example, and referring again to FIG. 10, the optimal initial matching point 1012 for the first type of load has a cavity match (e.g., implemented by network 411) of about 80 percent of the network's maximum value, and has an RF signal source match (e.g., implemented by network 410) of about 10 percent of the network's maximum value. Assuming each of the variable inductance networks has a structure similar to the network 500 of FIG. 5, for example, and assuming that the states from Table 1—Total inductance values for all possible variable inductance network states, above, apply, then for the first type of load, system controller may initialize the variable inductance network so that the cavity match network (e.g., network 411) has state 12 (i.e., about 80 percent of the maximum possible inductance of network 411), and the RF signal source match network (e.g., network 410) has state 2 (i.e., about 10 percent of the maximum possible inductance of network 410). Conversely, the optimal initial matching point 1022 for the second type of load has a cavity match (e.g., implemented by network 411) of about 40 percent of the network's maximum value, and has an RF signal source match (e.g., implemented by network 410) of about 10 percent of the network's maximum value. Accordingly, for the second type of load, system controller may initialize the variable inductance network so that the cavity match network (e.g., network 411) has state 6 (i.e., about 40 percent of the maximum possible inductance of network 411), and the RF signal source match network (e.g., network 410) has state 2 (i.e., about 10 percent of the maximum possible inductance of network 410).

Referring again to FIG. 9, once the initial variable matching network configuration is established, the system controller may perform a process 910 of adjusting, if necessary, the configuration of the variable impedance matching network to find an acceptable or best match based on actual measurements that are indicative of the quality of the match. According to an embodiment, this process includes causing the RF signal source (e.g., RF signal source 340) to supply a relatively low power RF signal through the variable impedance matching network to the first electrode (e.g., first electrode 370), in block 912. The system controller may control the RF signal power level through control signals to the power supply and bias circuitry (e.g., circuitry 350, FIG. 3), where the control signals cause the power supply and bias circuitry to provide supply and bias voltages to the amplifiers (e.g., amplifier stages 344, 346, FIG. 3) that are consistent with the desired signal power level. For example, the relatively low power RF signal may be a signal having a power level in a range of about 10 W to about 20 W, although different power levels alternatively may be used. A relatively low power level signal during the match adjustment process 910 is desirable to reduce the risk of damaging the cavity or load (e.g., if the initial match causes high reflected power), and to reduce the risk of damaging the switching components of the variable inductance networks (e.g., due to arcing across the switch contacts).

In block 914, power detection circuitry (e.g., power detection circuitry 380, FIG. 3) then measures the forward and/or reflected signal power along the transmission path (e.g., path 348, FIG. 3) between the RF signal source and the first electrode, and provides those measurements to the system controller. The system controller may then determine a ratio between the reflected and forward signal powers, and may determine the S11 parameter for the system based on the ratio. The system controller may store the calculated ratios and/or S11 parameters for future evaluation or comparison, in an embodiment.

In block 916, the system controller may determine, based on the reflected-to-forward signal power ratio and/or the S11 parameter and/or the reflected signal power magnitude, whether or not the match provided by the variable impedance matching network is acceptable (e.g., the ratio is 10 percent or less, or compares favorably with some other criteria). Alternatively, the system controller may be configured to determine whether the match is the "best" match. A "best" match may be determined, for example, by iteratively measuring the forward and/or reflected RF power for all possible impedance matching network configurations (or at least for a defined subset of impedance matching network configurations), and determining which configuration results in the lowest reflected-to-forward power ratio or reflected power magnitude.

When the system controller determines that the match is not acceptable or is not the best match, the system controller may adjust the match, in block 918, by reconfiguring the variable inductance matching network. For example, this may be achieved by sending control signals to the variable impedance matching network, which cause the network to increase and/or decrease the variable inductances within the network (e.g., by causing the variable inductance networks 410, 411 to have different inductance states). After reconfiguring the variable inductance network, blocks 914, 916, and 918 may be iteratively performed until an acceptable or best match is determined in block 916.

Once an acceptable or best match is determined, the defrosting operation may commence. Commencement of the defrosting operation includes increasing the power of the RF signal supplied by the RF signal source (e.g., RF signal source 340) to a relatively high power RF signal, in block 920. Once again, the system controller may control the RF signal power level through control signals to the power supply and bias circuitry (e.g., circuitry 350, FIG. 3), where the control signals cause the power supply and bias circuitry to provide supply and bias voltages to the amplifiers (e.g., amplifier stages 344, 346, FIG. 3) that are consistent with the desired signal power level. For example, the relatively high power RF signal may be a signal having a power level in a range of about 50 W to about 500 W, although different power levels alternatively may be used.

In block 922, power detection circuitry (e.g., power detection circuitry 380, FIG. 3) then periodically measures the forward and/or reflected power signal power along the transmission path (e.g., path 348, FIG. 3) between the RF signal source and the first electrode, and provides those measurements to the system controller. The system controller again may determine a ratio between the reflected and/or forward signal powers, and may determine the S11 parameter for the system based on the ratio. The system controller may store the calculated ratios and/or S11 parameters and/or reflected power magnitudes for future evaluation or comparison, in an embodiment. According to an embodiment, the periodic measurements of the forward and/or reflected power may be taken at a fairly high frequency (e.g., on the order of milliseconds) or at a fairly low frequency (e.g., on the order of seconds). For example, a fairly low frequency for taking the periodic measurements may be a rate of one measurement every 10 seconds to 20 seconds.

In block 924, the system controller may determine, based on one or more calculated reflected-to-forward signal power ratios and/or one or more calculated S11 parameters and/or one or more reflected power magnitude measurements, whether or not the match provided by the variable impedance matching network is acceptable. For example, the system controller may use a single calculated reflected-to-forward signal power ratio or S11 parameter or reflected power measurement in making this determination, or may take an average (or other calculation) of a number of previously-calculated reflected-to-forward power ratios or S11 parameters or reflected power measurements in making this determination. To determine whether or not the match is acceptable, the system controller may compare the calculated ratio and/or S11 parameter and/or reflected power measurement to a threshold, for example. For example, in one embodiment, the system controller may compare the calculated reflected-to-forward signal power ratio to a threshold of 10 percent (or some other value). A ratio below 10 percent may indicate that the match remains acceptable, and a ratio above 10 percent may indicate that the match is no longer acceptable. When the calculated ratio or S11 parameter or reflected power measurement is greater than the threshold (i.e., the comparison is unfavorable), indicating an unacceptable match, then the system controller may initiate re-configuration of the variable impedance matching network by again performing process 910.

As discussed previously, the match provided by the variable impedance matching network may degrade over the course of a defrosting operation due to impedance changes of the load (e.g., load 316, FIG. 3) as the load warms up. It has been observed that, over the course of a defrosting operation, an optimal cavity match may be maintained by decreasing the cavity match inductance (e.g., by decreasing the inductance of variable inductance network 411, FIG. 4) and by increasing the RF signal source inductance (e.g., by increasing the inductance of variable inductance network 410, FIG. 4). Referring again to FIG. 10, for example, an optimal match for the first type of load at the end of a defrosting operation is indicated by point 1014, and an optimal match for the second type of load at the end of a defrosting operation is indicated by point 1024. In both cases, tracking of the optimal match between initiation and completion of the defrosting operations involves gradually decreasing the inductance of the cavity match and increasing the inductance of the RF signal source match.

According to an embodiment, in the iterative process 910 of re-configuring the variable impedance matching network, the system controller may take into consideration this tendency. More particularly, when adjusting the match by reconfiguring the variable impedance matching network in block 918, the system controller initially may select states of the variable inductance networks for the cavity and RF signal source matches that correspond to lower inductances (for the cavity match, or network 411, FIG. 4) and higher inductances (for the RF signal source match, or network 410, FIG. 4). By selecting impedances that tend to follow the expected optimal match trajectories (e.g., those illustrated in FIG. 10), the time to perform the variable impedance matching network reconfiguration process 910 may be reduced, when compared with a reconfiguration process that does not take these tendencies into account.

In an alternate embodiment, the system controller may instead iteratively test each adjacent configuration to attempt to determine an acceptable configuration. For example, referring again to Table 1—Total inductance values for all possible variable inductance network states, above, if the current configuration corresponds to state 12 for the cavity matching network and to state 3 for the RF signal source matching network, the system controller may test states 11 and/or 13 for the cavity matching network, and may test states 2 and/or 4 for the RF signal source matching network. If those tests do not yield a favorable result (i.e., an acceptable match), the system controller may test states 10 and/or 14 for the cavity matching network, and may test states 1 and/or 5 for the RF signal source matching network, and so on.

In actuality, there are a variety of different searching methods that the system controller may employ to re-configure the system to have an acceptable impedance match, including testing all possible variable impedance matching network configurations. Any reasonable method of searching for an acceptable configuration is considered to fall within the scope of the inventive subject matter. In any event, once an acceptable match is determined in block 916, the defrosting operation is resumed in block 920, and the process continues to iterate.

Referring back to block 924, when the system controller determines, based on one or more calculated reflected-to-forward signal power ratios and/or one or more calculated S11 parameters and/or one or more reflected power measurements, that the match provided by the variable impedance matching network is still acceptable (e.g., the calculated ratio or S11 parameter is less than the threshold, or the comparison is favorable), the system may evaluate whether or not an exit condition has occurred, in block 926. In actuality, determination of whether an exit condition has occurred may be an interrupt driven process that may occur at any point during the defrosting process. However, for the purposes of including it in the flowchart of FIG. 9, the process is shown to occur after block 924.

In any event, several conditions may warrant cessation of the defrosting operation. For example, the system may determine that an exit condition has occurred when a safety interlock is breached (e.g., the drawer/door has been opened). Alternatively, the system may determine that an exit condition has occurred upon expiration of a timer that was set by the user (e.g., through user interface 320, FIG. 3) or upon expiration of a timer that was established by the system controller based on the system controller's estimate of how long the defrosting operation should be performed.

If an exit condition has not occurred, then the defrosting operation may continue by iteratively performing blocks 922 and 924 (and the matching network reconfiguration process 910, as necessary). When an exit condition has occurred, then in block 928, the system controller causes the supply of the RF signal by the RF signal source to be discontinued. For example, the system controller may disable the RF signal generator (e.g., RF signal generator 342, FIG. 3) and/or may cause the power supply and bias circuitry (e.g., circuitry 350, FIG. 3) to discontinue provision of the supply current. In addition, the system controller may send signals to the user interface (e.g., user interface 320, FIG. 3) that cause the user interface to produce a user-perceptible indicia of the exit condition (e.g., by displaying "drawer open", "door open" or "done" on a display device, or providing an audible tone). The method may then end.

It should be understood that the order of operations associated with the methods described herein and depicted in the figures correspond to example embodiments, and should not be construed to limit the sequence of operations only to the illustrated orders. Instead, some operations may be performed in different orders, and/or some operations may be performed in parallel.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

In accordance with an embodiment, a system may include a radio frequency (RF) signal source configured to produce an RF signal, a first electrode that is electrically coupled to the RF signal source and that is configured to receive the RF signal from the RF signal source and to responsively radiate electromagnetic energy into a cavity positioned next to the first electrode, a conductive structure that is disposed a distance from the first electrode, and a ground reference structure that is electrically coupled to the conductive structure. The conductive structure may overlap and be capacitively coupled to a portion of the first electrode.

In accordance with an aspect of the embodiment, ground reference structure may include a containment structure that encloses the first electrode, the cavity, and the conductive structure In accordance with an aspect of the embodiment, the first electrode may have a first side and a second side opposite the first side. The cavity may be positioned next to the first side of the first electrode. The conductive structure may be disposed the distance from the second side of the first electrode.

In accordance with an aspect of the embodiment, the first electrode and the conductive structure may form a parallel plate capacitor.

In accordance with an aspect of the embodiment, the system may further include a first dielectric interposed between the first electrode and the conductive structure.

In accordance with an aspect of the embodiment, the system may further include a second dielectric interposed between the first dielectric and the conductive structure. The first dielectric may have a different dielectric constant than the second dielectric.

In accordance with an aspect of the embodiment, the first dielectric may include polytetrafluorethylene. The second dielectric may include air.

In accordance with an aspect of the embodiment, the conductive structure may be electrically coupled to the containment structure through a conductive bridge.

In accordance with another aspect of the embodiment, the conductive bridge may include a proximal end that is electrically and physically coupled to the containment structure, and a distal end that is electrically and physically coupled to the conductive structure. The proximal end may be substantially perpendicular to the distal end.

In accordance with an aspect of the embodiment, a distance between the conductive structure and the first electrode may be adjustable.

In accordance with an embodiment, a system may include a first electrode that is electrically coupled to a radio frequency (RF) signal source and that is configured to receive an RF signal from the RF signal source and to responsively radiate electromagnetic energy into a cavity positioned next to the first electrode, and a conductive plate disposed adjacent to the first electrode and electrically coupled to a ground reference structure. The conductive plate and a portion of the first electrode may form a capacitor.

In accordance with an aspect of the embodiment, the system may further include at least one low-k dielectric interposed between the conductive plate and the first electrode.

In accordance with an aspect of the embodiment, the system may further include the ground reference structure, which may include a containment structure that surrounds the first electrode, the cavity, and the conductive plate.

In accordance with an aspect of the embodiment, the system may further include a conductive bridge having a proximal end that is welded to the containment structure, and having a distal end that is welded to the conductive plate.

In accordance with an aspect of the embodiment, the conductive plate may be external to the cavity.

In accordance with an aspect of the embodiment, the system may further include a variable inductance network electrically coupled between the RF signal source and the first electrode, and a fixed inductance network electrically coupled between the variable inductance network and the first electrode.

In accordance with an embodiment, a thermal increase system may include a containment structure, an RF signal source that is positioned within the containment structure, and that is configured to supply an RF signal, a first electrode that is positioned within the containment structure, a transmission path electrically coupled between an output of the RF signal source and the first electrode, and a conductive plate that is positioned within the containment structure adjacent to the first electrode, and that is electrically coupled to a ground reference structure. The RF signal may have a forward signal power along the transmission path. The capacitor may be formed from the conductive plate and a portion of the first electrode.

In accordance with an aspect of the embodiment, the thermal increase system may further include an impedance matching network electrically coupled along the transmission path between the output of the RF signal source and the first electrode. The impedance matching network may include a variable inductance network.

In accordance with an aspect of the embodiment, the thermal increase system may further include power detection circuitry configured to detect reflected signal power along the transmission path, and a controller configured to modify, based on the reflected signal power, an inductance value of the variable inductance network to reduce a ratio of the reflected signal power to the forward signal power.

In accordance with an aspect of the embodiment, the thermal increase system may further include a cavity located next to a first side of the first electrode. The conductive plate may be positioned outside of the cavity and a distance from a second side of the first electrode.

In accordance with an aspect of the embodiment, the thermal increase system may further include a first dielectric positioned between the conductive plate and the first electrode. The first dielectric may have a breakdown voltage that is greater than a breakdown voltage of air.

In accordance with an aspect of the embodiment, the thermal increase system may further include a second dielectric positioned between the first dielectric and the conductive plate that is different than the first dielectric.

In accordance with an aspect of the embodiment, the thermal increase system may further include a conductive bridge having a proximal end that is attached to the containment structure, and having a distal end that is attached to the conductive plate. The proximal end may be aligned perpendicular to the distal end.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The invention claimed is:

1. A system comprising:
a radio frequency (RF) signal source configured to produce an RF signal;
a first electrode that is electrically coupled to the RF signal source and that is configured to receive the RF signal from the RF signal source and to responsively radiate electromagnetic energy into a cavity that is configured to contain a load to be heated, wherein the first electrode is positioned at a first side of the cavity;
a second electrode positioned at a second side of the cavity that is opposite the first side of the cavity;
a conductive structure that is disposed a distance from the first electrode, wherein the conductive structure also is positioned at the first side of the cavity, and the conductive structure overlaps and is capacitively coupled to a portion of the first electrode;
a ground reference structure that is electrically coupled to the conductive structure;
a variable impedance matching network comprised of a network of passive components electrically coupled between the RF signal source and the first electrode; and
a controller configured to change a state of the variable impedance matching network over a course of an operation to dynamically match a changing input impedance of the cavity.

2. The system of claim 1, wherein the ground reference structure comprises:
a containment structure that encloses the first electrode, the cavity, and the conductive structure.

3. The system of claim 1, wherein:
the first electrode has a first side and a second side opposite the first side;
the cavity is positioned next to the first side of the first electrode; and
the conductive structure is disposed the distance from the second side of the first electrode.

4. The system of claim 1, wherein the first electrode and the conductive structure form a parallel plate capacitor.

5. The system of claim 1, further comprising:
a first dielectric interposed between the first electrode and the conductive structure.

6. The system of claim 5, further comprising:
a second dielectric interposed between the first dielectric and the conductive structure, wherein the first dielectric has a different dielectric constant than the second dielectric.

7. The system of claim 6, wherein the first dielectric includes polytetrafluorethylene, and wherein the second dielectric includes air.

8. The system of claim 2, wherein the conductive structure is electrically coupled to the containment structure through a conductive bridge.

9. The system of claim 8, wherein the conductive bridge comprises a proximal end that is electrically and physically coupled to the containment structure, and a distal end that is electrically and physically coupled to the conductive structure, wherein the proximal end is substantially perpendicular to the distal end.

10. The system of claim 1, wherein the distance between the conductive structure and the first electrode is adjustable.

11. A system comprising:
a first electrode that is electrically coupled to a radio frequency (RF) signal source and that is configured to receive an RF signal from the RF signal source and to responsively radiate electromagnetic energy into a cavity that is configured to contain a load to be heated, wherein the first electrode is positioned at a first side of the cavity;
a second electrode positioned at a second side of the cavity that is opposite the first side of the cavity;
a conductive plate disposed adjacent to the first electrode and electrically coupled to a ground reference structure, wherein the conductive plate also is positioned at the first side of the cavity, and the conductive plate and a portion of the first electrode form a capacitor;
a variable impedance matching network comprised of a network of passive components electrically coupled between the RF signal source and the first electrode; and
a controller configured to change a state of the variable impedance matching network over a course of an operation to dynamically match a changing input impedance of the cavity.

12. The system of claim 11, further comprising:
at least one low-k dielectric interposed between the conductive plate and the first electrode.

13. The system of claim 11, further comprising:
the ground reference structure, which comprises a containment structure that surrounds the first electrode, the cavity, and the conductive plate.

14. The system of claim 13, further comprising:
a conductive bridge having a proximal end that is welded to the containment structure, and having a distal end that is welded to the conductive plate.

15. The system of claim 11, wherein the conductive plate is external to the cavity.

16. A system comprising:
a first electrode that is electrically coupled to a radio frequency (RF) signal source and that is configured to receive an RF signal from the RF signal source and to responsively radiate electromagnetic energy into a cavity positioned on a first side of the first electrode;
a conductive plate disposed adjacent to a second side of the first electrode and electrically coupled to a ground reference structure, wherein the conductive plate and a portion of the first electrode form a capacitor;
a variable inductance network electrically coupled between the RF signal source and the first electrode; and
a fixed inductance network electrically coupled between the variable inductance network and the first electrode.

17. A thermal increase system comprising:
a containment structure;
a radio frequency (RF) signal source that is positioned within the containment structure and that is configured to supply an RF signal;
a cavity that is positioned within the containment structure, and which is configured to contain a load to be heated;
a first electrode that is positioned within the containment structure at a first side of the cavity;
a transmission path electrically coupled between an output of the RF signal source and the first electrode, wherein the RF signal has a forward signal power along the transmission path;
a conductive plate that is positioned within the containment structure adjacent to the first electrode, wherein the conductive plate also is positioned within the containment structure at the first side of the cavity, and the conductive plate is electrically coupled to a ground reference structure, wherein a capacitor is formed from the conductive plate and a portion of the first electrode;
a variable impedance matching network electrically coupled along the transmission path between the output of the RF signal source and the first electrode; and
a controller configured to change a state of the variable impedance matching network over a course of an operation to dynamically match a changing input impedance of the cavity.

18. A thermal increase system comprising:
a containment structure;
a radio frequency (RF) signal source that is positioned within the containment structure and that is configured to supply an RF signal;
a first electrode that is positioned within the containment structure;
a transmission path electrically coupled between an output of the RF signal source and the first electrode, wherein the RF signal has a forward signal power along the transmission path;
a conductive plate that is positioned within the containment structure adjacent to the first electrode, and that is electrically coupled to a ground reference structure, wherein a capacitor is formed from the conductive plate and a portion of the first electrode; and
an impedance matching network electrically coupled along the transmission path between the output of the RF signal source and the first electrode, wherein the impedance matching network comprises a variable inductance network.

19. The thermal increase system of claim 18, further comprising:
power detection circuitry configured to detect reflected signal power along the transmission path; and
a controller configured to modify, based on the reflected signal power, an inductance value of the variable inductance network to reduce a ratio of the reflected signal power to the forward signal power.

20. The thermal increase system of claim 17, wherein:
the cavity is located next to a first side of the first electrode, and wherein the conductive plate is positioned outside of the cavity and a distance from a second side of the first electrode.

21. The thermal increase system of claim 17, further comprising:
a first dielectric positioned between the conductive plate and the first electrode, wherein the first dielectric has a breakdown voltage that is greater than a breakdown voltage of air.

22. The thermal increase system of claim 21, further comprising:

a second dielectric positioned between the first dielectric and the conductive plate that is different than the first dielectric.

23. The thermal increase system of claim 17, further comprising:
a conductive bridge having a proximal end that is attached to the containment structure, and having a distal end that is attached to the conductive plate, wherein the proximal end is aligned perpendicular to the distal end.

* * * * *